(12) United States Patent  
Giambalvo et al.

(10) Patent No.: US 8,957,920 B2  
(45) Date of Patent: Feb. 17, 2015

(54) ALTERNATIVE SEMANTICS FOR ZOOM OPERATIONS IN A ZOOMABLE SCENE

(75) Inventors: Daniel J. Giambalvo, Seattle, WA (US); Andrew B. Rothbart, Seattle, WA (US); Jennifer M. Lin, Seattle, WA (US); Alex D. Weinstein, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 989 days.

(21) Appl. No.: 12/823,658

(22) Filed: Jun. 25, 2010

(65) Prior Publication Data

US 2011/0316884 A1    Dec. 29, 2011

(51) Int. Cl.
```
G09G 5/00      (2006.01)
G06F 3/0482    (2013.01)
G06F 3/0481    (2013.01)
G06F 17/30     (2006.01)
```

(52) U.S. Cl.
CPC ........ G06F 17/30058 (2013.01); G06F 3/0482 (2013.01); G06F 2203/04806 (2013.01); G06F 3/04815 (2013.01)
USPC .......................................... 345/660; 345/619

(58) Field of Classification Search
USPC .......................................... 345/581; 709/226
See application file for complete search history.

(56) References Cited

U.S. PATENT DOCUMENTS

| | | |
|---|---|---|
| 5,105,184 A | 4/1992 | Pirani et al. |
| 5,341,466 A | 8/1994 | Perlin |
| 5,555,368 A | 9/1996 | Orton et al. |
| 5,920,325 A | 7/1999 | Morgan et al. |
| 5,949,432 A | 9/1999 | Gough et al. |
| 6,034,661 A | 3/2000 | Servan-Scheiber et al. |

(Continued)

FOREIGN PATENT DOCUMENTS

| | | |
|---|---|---|
| CA | 2568975 A1 | 5/2007 |
| KR | 20010088131 A | 9/2001 |

(Continued)

OTHER PUBLICATIONS

Bederson, et al., "Pad++: A Zoomable Graphical Interface System", Retrieved at << http://www.sigchi.org/chi95/proceedings/demos/pad_bdy.htm >>, Conference on Human Factors in Computing Systems, Conference companion on Human factors in computing systems, May 7-11, 1995, pp. 3.

(Continued)

*Primary Examiner* — Phi Hoang  
(74) *Attorney, Agent, or Firm* — Steve Spellman; Jim Ross; Micky Minhas

(57) ABSTRACT

A scene comprising a set of visual elements may allow a user to perform "zoom" operations in order to navigate the depth of the scene. The "zoom" semantic is often applied to simulate optical visual depth, wherein the visual elements are presented with different visual dimensions and visual resolution to simulate physical proximity or distance. However, the "zoom" semantic may be alternatively applied to other aspects of the visual elements of a scene, such as a user selection of a zoomed-in visual element, a "drill-down" operation on a data set, or navigation through a portal in a first data set to view a second data set. These alternative "zoom" semantics may be achieved by presenting the effects of a "zoom" operation within the scene on the visual presentation of the visual element in a manner other than an adjustment of the visual dimensions and resolution of the visual element.

20 Claims, 10 Drawing Sheets

(56) References Cited

U.S. PATENT DOCUMENTS

| | | |
|---|---|---|
| 6,331,861 B1 | 12/2001 | Gever et al. |
| 6,513,152 B1 | 1/2003 | Branson et al. |
| 6,771,290 B1 | 8/2004 | Hoyle |
| 6,785,667 B2 | 8/2004 | Orbanes et al. |
| 6,809,747 B1 | 10/2004 | Ichioka |
| 6,845,273 B1 | 1/2005 | Taylor |
| 6,850,260 B1 | 2/2005 | Taylor |
| 6,868,525 B1 | 3/2005 | Szabo |
| 6,937,950 B2 | 8/2005 | Cragun et al. |
| 7,028,072 B1 | 4/2006 | Kliger et al. |
| 7,038,701 B2 | 5/2006 | Niemi |
| 7,039,872 B1 | 5/2006 | Raheman |
| 7,133,054 B2 | 11/2006 | Aguera y Arcas |
| 7,173,623 B2 | 2/2007 | Calkins et al. |
| 7,190,839 B1 | 3/2007 | Feather et al. |
| 7,194,718 B2 | 3/2007 | Sano et al. |
| 7,219,309 B2 | 5/2007 | Kaasela et al. |
| 7,260,789 B2 | 8/2007 | Hunleth et al. |
| 7,337,392 B2 | 2/2008 | Lue |
| 7,345,688 B2 | 3/2008 | Baudisch et al. |
| 7,386,806 B2 | 6/2008 | Wroblewski |
| 7,516,402 B2 | 4/2009 | Koivisto et al. |
| 7,568,166 B2 | 7/2009 | Kato |
| 7,634,723 B2 | 12/2009 | Layzell |
| 7,634,793 B2 | 12/2009 | Hunleth et al. |
| 7,707,503 B2 | 4/2010 | Good et al. |
| 7,984,386 B1 | 7/2011 | Zuverink |
| 8,655,716 B1 | 2/2014 | Barnes et al. |
| 2002/0059024 A1 | 5/2002 | Ogaki |
| 2003/0184590 A1 | 10/2003 | Will |
| 2003/0204637 A1 | 10/2003 | Ogaki |
| 2004/0073538 A1 | 4/2004 | Leishman et al. |
| 2005/0021397 A1 | 1/2005 | Cui et al. |
| 2005/0091111 A1 | 4/2005 | Green et al. |
| 2005/0091672 A1 | 4/2005 | Debique et al. |
| 2005/0116966 A1 | 6/2005 | Graham et al. |
| 2005/0155042 A1 | 7/2005 | Kolb et al. |
| 2005/0197763 A1* | 9/2005 | Robbins et al. ............... 701/200 |
| 2005/0210399 A1 | 9/2005 | Filner et al. |
| 2006/0020308 A1 | 1/2006 | Muldner |
| 2006/0039655 A1 | 2/2006 | Wilson |
| 2006/0059225 A1 | 3/2006 | Stonehocker et al. |
| 2006/0111970 A1 | 5/2006 | Hill |
| 2006/0156228 A1* | 7/2006 | Gallo et al. ................... 345/581 |
| 2006/0184966 A1 | 8/2006 | Hunleth et al. |
| 2006/0200308 A1 | 9/2006 | Arutunian |
| 2006/0224993 A1* | 10/2006 | Wong et al. ................... 715/800 |
| 2006/0241859 A1 | 10/2006 | Kimchi et al. |
| 2006/0277477 A1 | 12/2006 | Christenson |
| 2006/0282786 A1 | 12/2006 | Shaw et al. |
| 2007/0003152 A1 | 1/2007 | Hoppe |
| 2007/0027771 A1 | 2/2007 | Collins et al. |
| 2007/0050253 A1 | 3/2007 | Biggs et al. |
| 2007/0074166 A1 | 3/2007 | Overturf et al. |
| 2007/0083408 A1 | 4/2007 | Altberg et al. |
| 2007/0100802 A1 | 5/2007 | Celik |
| 2007/0165050 A1 | 7/2007 | Baar |
| 2007/0265923 A1 | 11/2007 | Krassner et al. |
| 2008/0034292 A1 | 2/2008 | Brunner et al. |
| 2008/0034328 A1 | 2/2008 | Cahill et al. |
| 2008/0052629 A1 | 2/2008 | Phillips et al. |
| 2008/0201655 A1 | 8/2008 | Borchardt et al. |
| 2009/0037838 A1 | 2/2009 | Gedye et al. |
| 2009/0064219 A1 | 3/2009 | Minor |
| 2009/0128581 A1 | 5/2009 | Brid et al. |
| 2009/0138826 A1* | 5/2009 | Barros ........................... 715/841 |
| 2009/0150768 A1 | 6/2009 | Bae et al. |
| 2009/0177538 A1 | 7/2009 | Brewer et al. |
| 2009/0327969 A1 | 12/2009 | Estrada |
| 2010/0017733 A1 | 1/2010 | Barros |
| 2010/0082709 A1 | 4/2010 | Yhmamoto |
| 2010/0082818 A1* | 4/2010 | Paul et al. ..................... 709/226 |
| 2010/0146436 A1 | 6/2010 | Jakobson et al. |
| 2010/0211515 A1 | 8/2010 | Woodings et al. |
| 2011/0067068 A1* | 3/2011 | Hunleth et al. ................. 725/52 |
| 2011/0316884 A1 | 12/2011 | Giambalvo et al. |

FOREIGN PATENT DOCUMENTS

| | | |
|---|---|---|
| KR | 1020090062729 A | 6/2009 |
| WO | 01/41022 A1 | 6/2001 |
| WO | 2006/058371 A1 | 6/2006 |
| WO | 2009/089166 A2 | 7/2009 |
| WO | 2011/063427 A1 | 5/2011 |

OTHER PUBLICATIONS

Salamin, et al., "Context Aware, Multimodal, and Semantic Rendering Engine", Retrieved at << http://vrlab.epfl.ch/~psalamin/publications/vrcai09.pdf >>, Virtual Reality Continuum and Its Applications, Proceedings of the 8th International Conference on Virtual Reality Continuum and its Applications in Industry, Dec. 14-15, 2009, pp. 6.

"Panel Bar for ASP.NET AJAX", Retrieved at << http://www.telerik.com/products/aspnet-ajax/panelbar.aspx#semantic-rendering-for-minimal-html >>, Retrieved Date: Mar. 30, 2010, pp. 7.

König, et al., "Squidy: A Zoomable Design Environment for Natural User Interfaces", Retrieved at << http://hci.uni-konstanz.de/downloads/koenig_Squidy_CHI09.pdf >>, Conference on Human Factors in Computing Systems, Proceedings of the 27th international conference extended abstracts on Human factors in computing systems, Apr. 4-9, 2009, pp. 6.

Gundelsweiler, et al., "Zeus—Zoomable Explorative User Interface for Searching and Object Presentation", Retrieved at << http://citeseerx.ist.psu.edu/viewdoc/download?doi=10.1.1.66.5093&rep=rep1&type=pdf >>, Lecture Notes in Computer Science, Proceedings of the 2007 conference on Human interface: Part I, Jul. 22-27, 2007, pp. 10.

Fried, Ina, "Gates outlines goals for Microsoft's ad business" May 9, 2007, pp. 1-2, http://www.onekitcom/store/review/gates_outlines_goals_for_microsoft~onequote~s_ad_business.html.

Geron, Tomio, Exponential Ad Targeting', Aug. 29, 2007, pp. 1-4, http://www.redherring.com/Home/22682.

Ballmer, Steve, "Steve Ballmer: ANA Annual Conference", Oct. 12, 2007, pp. 1-5, http://www.microsoft.com/Presspass/exec/steve/2007/10-12ANAConference.mspx.

"International Search Report", Mailed Date: Feb. 9, 2012, Application No. PCT/US2011/041542, Filed Date: Jun. 23, 2011, pp. 9.

Reply final Chinese Office Action Chinese Application No. 200980102066.9 dated Jul. 8, 2013, 5 pgs.

Non-Final Office Action cited in U.S. Appl. No. 11/942,733 dated Sep. 30, 2011, 24 pgs.

Reply Non-Final Office Action cited in U.S. Appl. No. 11/942,733 dated Dec. 20, 2011, 17 pgs.

Final Office Action cited in U.S. Appl. No. 11/942,733 dated Mar. 8, 2012, 18 pgs.

Reply Final Office Action cited in U.S. Appl. No. 11/942,733 dated Sep. 10, 2012, 17 pgs.

Non-Final Office Action cited in U.S. Appl. No. 11/970,530 dated Jan. 6, 2011, 23 pgs.

Reply Non-Final Office Action cited in U.S. Appl. No. 11/970,530 dated Apr. 6, 2011, 16 pgs.

Final Office Action cited in U.S. Appl. No. 11/970,530 dated May 3, 2011, 17 pgs.

Reply Final Office Action cited in U.S. Appl. No. 11/970,530 dated Jan. 6, 2011, 22 pgs.

Non-Final Office Action cited in U.S. Appl. No. 11/833,780 dated Sep. 15, 2010, 21 pgs.

Reply Non-Final Office Action cited in U.S. Appl. No. 11/833,780 dated Jan. 18, 2011, 17 pgs.

Final Office Action cited in U.S. Appl. No. 11/833,780 dated Apr. 12, 2011, 27 pgs.

Reply Final Office Action cited in U.S. Appl. No. 11/833,780 dated Aug. 2, 2011, 18 pgs.

Notice of Allowance cited in U.S. Appl. No. 11/833,780 dated Sep. 19, 2011, 20 pgs.

(56) References Cited

OTHER PUBLICATIONS

Int. Search Report cited in PCT Application No. PCT/US2009/030128 dated Jul. 22, 2008, 11 pgs.
Int. Preliminary Report on Patentability cited in PCT Application No. PCT/US2009/030128 dated Jul. 13, 2010, 8 pgs.
First Chinese Office Action cited in Chinese Application No. 200980102066.9 dated Nov. 9, 2011, 8 pgs.
Reply first Chinese Office Action cited in Chinese Application No. 200980102066.9 dated Nov. 9, 2011, 4 pgs.
Second Chinese Office Action cited in Chinese Application No. 200980102066.9 dated Sep. 19, 2012, 7 pgs.
Reply second Chinese Office Action cited in Chinese Application No. 200980102066.9 dated Nov. 8, 2012, 4 pgs.
Final Chinese Office Action cited in Chinese Application No. 200980102066.9 dated Mar. 4, 2013, 8 pgs.
EP Search Report cited in EP Application No. 09701303.1 dated Jul. 19, 2012, 8 pgs.
EP Communication cited in EP Application No. 09701303.1 dated Aug. 7, 2012, 1 pg.
Reply EP Communication cited in EP Application No. 09701303.1 dated Feb. 7, 2013, 12 pgs.
"IntelligentBox: a Constructive Visual Software Development System for Interactive 3D Graphic Applications", Yoshihiro Okada and Yuzuru Tanaka, Apr. 1995, IEEE, pp. 114-125.
"Virtual TAG" Technology From First Virtual Holdings Used in Online Ad for AT&T WorldNet Service, reprinted from the Internet at: http://www.thefreelibrary.comiVirtualTAG'+Technology+From+First+Virtual+Holdings+Used+in+Online+Ad . . . -a019481904, 4 pgs, Feb. 5, 1999.
"TNTserverTM 2008: 74", OGC-compliant Web Map Server (WMS), May 9, 2007, reprinted from the Internet at: http://www.microimages.com/products/tntserver.htm, 2 pgs.
"Raster Requirements for PAMAP Program", Oct. 7, 2005, Advanced Technology Studios, reprinted from the Internet at: http://www.dcnr.state.pa.us/topogeo/pamap/concdesignfinal.pdf, 76 pgs.
"Seadragon—Microsoft Will Change the Way We Use Screens", Jun. 2007, reprinted from the Internet at: http://www.thebetanews.com/seadragon-microsoft-will-change-the-way-we-use-screens/, 3 pgs.
"Mac OS X: Visual Quickstart Guide", Maria Langer, Peachpit Press, Published: Apr. 18, 2001, Chapter 3 File Management, "Views", 15 pgs.
Int. Preliminary Report on Patentability cited in PCT Application No. PCT/US2011/041542 dated Dec. 28, 2012, 5 pgs.
Non-Final Office Action cited in U.S. Appl. No. 11/942,733 dated Dec. 20, 2013, 27 pgs.
Reply Non-Final Office Action cited in U.S. Appl. No. 11/942,733 dated Mar. 20, 2014, 17 pgs.
Final Office Action cited in U.S. Appl. No. 11/942,733 dated Aug. 20, 2014, 26 pgs.
Non-Final Office Action cited in U.S. Appl. No. 11/970,530 dated Apr. 2, 2014, 17 pgs.
Reply Non-Final Office Action cited in U.S. Appl. No. 11/970,530 dated Aug. 4, 2014, 19 pgs.
EP Communication cited in EP Application No. 09701303.1 dated Jul. 17, 2013, 6 pgs.
Reply EP Communication cited in EP Application No. 09701303.1 dated Nov. 27, 2013, 11 pgs.
Australian Office Action cited in Australian Application No. 2011270887 dated Feb. 12, 2014, 3 pgs.
Reply Australian Office Action cited in Australian Application No. 2011270887 dated Mar. 19, 2014, 4 pgs.
Australian Office Action cited in Australian Application No. 2011270887 dated Apr. 24, 2014, 3 pgs.
Reply Australian Office Action cited in Australian Application No. 2011270887 dated May 29, 2014, 4 pgs.
Australian Notice of Allowance cited in Australian Application No. 2011270887 dated Jun. 13, 2014, 2 pgs.
EP Communication cited in European Application No. 11798893.1 dated Feb. 17, 2014, 8 pgs.
EP Communication cited in European Application No. 11798893.1 dated Mar. 6, 2014, 1 pg.
"First Office Action and Search Report Received in China Patent Application No. 201180031078.4", Mailed Date: Oct. 22, 2014, 17 pages.

\* cited by examiner

ALTERNATIVE SEMANTICS FOR ZOOM OPERATIONS IN A ZOOMABLE SCENE

CROSS-REFERENCE TO RELATED CASES

This application is related to copending U.S. patent application Ser. No. 11/970,530, entitled "ZOOMABLE ADVERTISEMENTS WITH TARGETED CONTENT," filed on Jan. 8, 2008.

BACKGROUND

Within the field of computing, many scenarios involve a scene comprising a collection of visual elements, such as an image album comprising a set of image images, a map comprising a set of locations, and a data set comprising a set of visually presented data items. These scenes may support zooming, such as zooming in to view an image in an image album at a larger size and higher visual resolution, or zooming out of a location in a map to achieve an understanding of the surrounding area. Such zooming may be achieved, e.g., by performing click operations with a pointer, by rotating a scroll wheel of a mouse, or by performing "pinch" and "stretch" operations on a multi-touch display. The zoom may be rendered in many ways, such as a prompt transition from the first zoom level to the second zoom level; a cross-fading between the view of the scene at the first zoom level and the view of the scene at the second zoom level; or a blurring of the scene at the first zoom level and a refocusing of the scene at the second zoom level.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

In many scenarios that support a "zoomable" user interface, various zoom operations result in the presentation of a new view of the scene where the visual elements are presented with larger or smaller visual dimensions, or at a higher or lower visual resolution. For example, a map may be rendered at an overview zoom level that may present various locations at small visual dimensions and/or at a low visual resolution, but when a user zooms in on a location, the map may load (e.g., from a map store) higher-visual-resolution versions of the locations and may render the locations with larger visual dimensions. Thus, zooming serves as a visual-depth-based semantic to render visual elements at lower or higher visual resolutions, and with smaller or larger visual dimensions, based on the proximity of the view to the proximity of the visual elements.

However, zoom operations may also refer to other semantics. Zooming in on a visual element may result in a new presentation of the visual element having visual differences other than changes to the visual dimensions and visual resolution of the presented visual element. For example, zooming in on a data set may be interpreted to view additional data relating to the zoomed-in portion, such as a "drill-down" operation (e.g., a scene representing an athletic sport might represent an entire league the first zoom level, but might permit the user to zoom in on a team name to present details of the team at a second zoom level, and to zoom in on the name of a player for the team to present details about the player at a third zoom level). Zooming in on an image may, in addition to a higher-visual-resolution or larger view of the image, result in a presentation of metadata about the image, such as the names of individuals and topics located in the image, and the time and place when the image was captured. Zooming in may also be utilized as a navigation semantic; e.g., zooming in on a particular portion of a map of a website may result in a presentation of the web page of the website corresponding to the zoomed-in portion. In these and other scenarios, zooming within a zoomable scene may therefore be used to represent many types of interaction with the visual objects of a scene other than visual dimension-and visual resolution-based transformations.

Presented herein are techniques for achieving various presentations of a zoomable scene that utilize alternative semantics for zoom operations. These techniques involve storing a set of visual presentations for respective visual elements present in the scene. At a first zoom level, a particular visual element may be presented with a first visual presentation, but at a second zoom level, the visual element may be presented with a second visual presentation that differs from the first visual presentation in aspects other than visual dimensions and visual resolution. For example, the second visual presentation of a data set may supplement the first visual presentation of the data set with additional information, a completely different data set, or a data object. (While the second visual presentation may also present visual dimensional and visual resolution-based differences, the present techniques relate to other visual differences between the first visual presentation and the second visual presentation.) In one such context, the zooming semantic is used to select a media item out of a set of media items for rendering; e.g., a zoomed-out collection of a set of video objects (such as video files) may present a set of preview images of respective represented videos, and zooming in on one of the video objects may cause it to begin playing the full-presentation video. Many such scenarios may be devised to utilize alternative semantics for zoom operations in regard to the visual elements of a zoomable scene. Configuring the scene to promote such visual transitions, with visual elements presented differently at different zoom levels, may be particularly useful while presenting a large number of items (e.g., as an overview of grouped items on which the user may zoom in to view more details) and/or a hierarchically structured data (e.g., where sub-elements of a particular zoomed-in level may be presented as small items on which the user may zoom in to navigate to a lower level in the hierarchy).

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
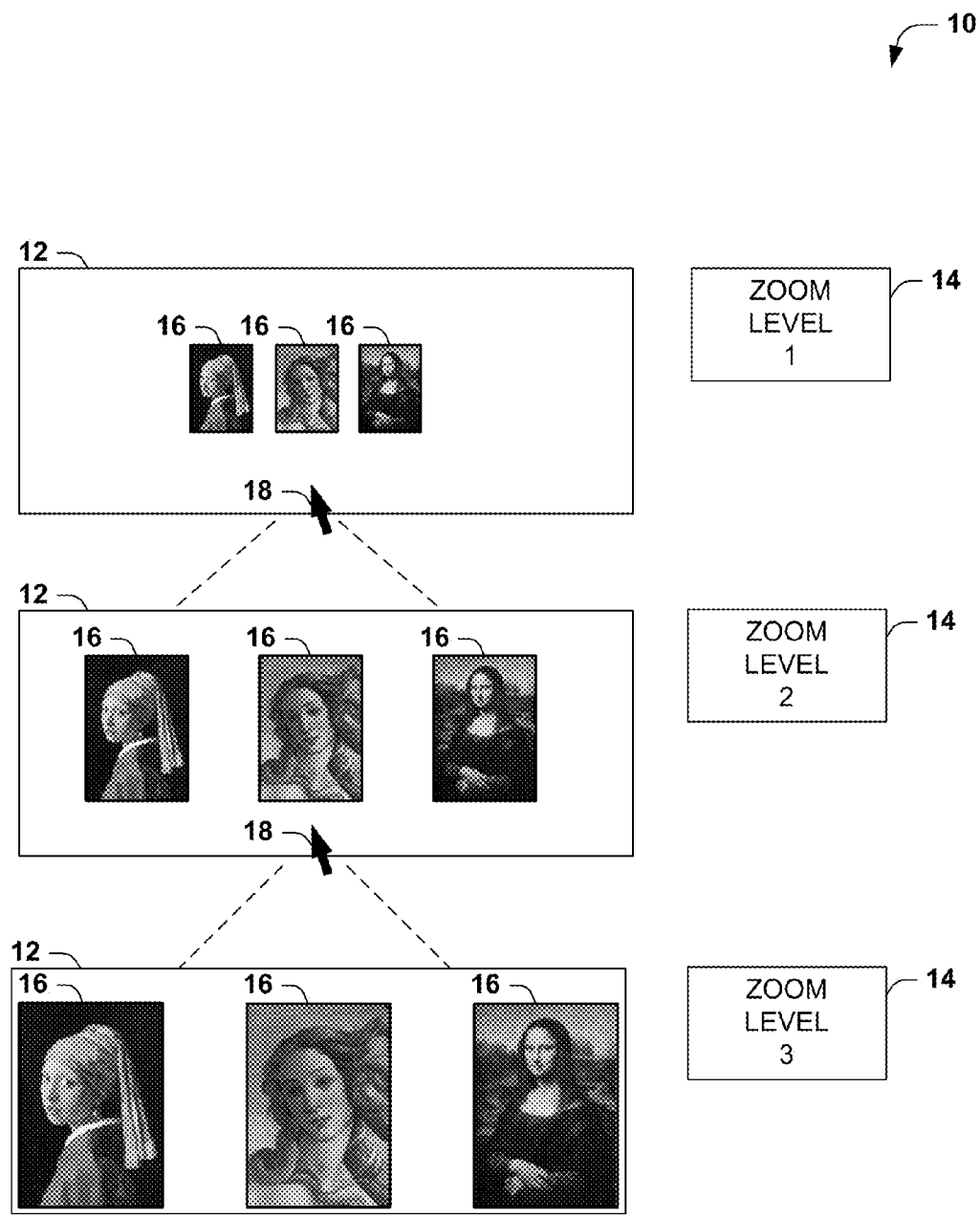
FIG. 1 is an illustration of an exemplary scenario featuring a zoomable scene using a visual dimensional and visual resolution semantic for a zoomable operation.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

Within the field of computing, many scenarios involve a scene comprising a set of visual elements, where the scene may be navigated through the use of a zoom operation. As a first example, an image library may be presented as a scene comprising a set of images, such as a set of thumbnail images arrayed in a linear, tiled, or arbitrary manner, such that the user may zoom in on a particular image to view it in more detail. As a second example, a document may be presented in a document reader application, and a user may zoom in to receive a magnified view of the text of the document. As a third example, a map may comprise a set of locations, and a user may zoom in to view a particular location at a higher size and visual resolution. The zoom operations may be performed in many ways; e.g., the user may use plus and minus keys on a keyboard, a scroll wheel on a mouse, a pointing gesture (such as a click or a lasso of a zoom region) with a pointing device such as a mouse, or a multi-touch gesture such as a "pinch" operation or a "stretch" operation. These and other operations may result in a transition within the application from a first zoom level to a second zoom level, such as zooming in or zooming out. These operations may also be combined with other visual operations (e.g., pan or rotate) in order to control the position of the viewport within the view.

FIG. 1 presents an exemplary scenario 10 featuring a scene 12 that permits zoom operations, and that is rendered as a view at a particular zoom level 14; e.g., a first zoom level 14 representing a relatively low degree of zoom, a second zoom level 14 representing a partially zoomed-in view, and a third (still higher) zoom level 14 representing a high degree of zoom. In this exemplary scenario, the scene 12 comprises a set of visual elements 16 comprising images of an image set that a user may wish to view. At the first zoom level 14, the visual elements 16 are comparatively small and low-quality, but as the zoom level 14 increases to a higher level in response to a zoom operation 18 (e.g., clicking on an area of the scene 12 with a pointing device), the visual elements 16 are presented at a higher quality with more detail. This configuration of the zoomable scene 12 permits the user to achieve an overview of the image set, and also to examine particular images in detail by zooming to a higher level in the proximity of a particular visual element 16.

The nature of the zoomable scene 12 presented in the exemplary scenario 10 of FIG. 1 may be presented in many other scenarios. As a first example, a map application (as a zoomable scene 12) featuring a set of locations (as visual elements 16) may permit a user to zoom in on a location to view it in detail. As a second example, an office productivity document (as a scene 12) may be rendered as a full page (e.g., with the characters of a document, the numbers of a spreadsheet, or the records of a database comprising the visual elements 16), and may permit a user to zoom in on a portion of the page to view the visual elements 16 at a higher magnification for easier reading. As a third example, an image editing application may present an overview an overview of an image at a low zoom level (comprising a set of pixels as visual elements 16), and may permit the user to zoom in on a portion of the image to permit examination and adjustment of particular sets of pixels. In these and other scenarios, a device configured to present the scene 12 may achieve this result, by, for a particular visual element 16, storing a high-quality version of each visual element 16 and downscaling each version to generate a smaller and lower-quality version for a lower zoom level 14; by storing several versions of each visual element 16, and presenting the version of each visual element 16 that is appropriate for the zoom level 14; and/or by producing a low-quality version of each visual element 16 at the low zoom level 14, and then supplementing the low-quality version with additional data to achieve higher-quality presentations of the visual element 16 for higher zoom levels 14.

A common concept among these scenarios is the use of zoom as a semantic for adjusting the simulated physical depth of the view along a Z-axis within the scene 12. For example, visual elements 16 may be presented at a low zoom level 14 as small in order to simulate distance between the user and the visual element 16, and the action of zooming in may resemble navigation along the Z-axis that brings the user closer to the visual elements 16, which are then presented with a larger size to simulate proximity. Therefore, the use of zoom in these scenarios serves as a navigational semantic that allows the user to adjust the Z-axis position of the view within the deep and zoomable scene 12. According to the mechanics of organic vision, when a visual element 16 is presented in proximity, it appears larger and more detailed. Similarly, adjustments in the zoom level 14 of the scene 12 may present simulations of depth by, for various visual elements 16, adjusting the visual dimensions and the visual resolution of the visual elements 16.

However, it may be appreciated that, in many scenarios featuring a zoomable scene 12 comprising a set of visual elements 16, the zooming factor may be partially decoupled from the zooming semantic, such that zooming in or out yields a different result than visual elements 16 having different visual dimensions and visual resolutions. As a first example, a user may zoom in on a visual element 16 of a scene 12 in order to indicate a selection of a particular visual element 16 for a subsequent operation. (This example may differ, e.g., from image editing applications, where a user may zoom in on a set of pixels of an image, but may then have to, as a separate and non-zoom operation, select the pixels of interest with a lasso tool.) As a second example, a user may zoom in on a portion of a data set (such as a set of numbers in a spreadsheet) as a request to view more detailed data about the numbers, e.g., a "drill-down" operation to navigate from a summary view of a portion of a data set to a more detailed view, or an "expand" operation applied to a collapsed node in a tree view of a hierarchical data set. Conversely, zooming out of the scene 12 from an expanded node may be translated as a "collapse" operation. As a third example, the scene 12 may represent a first object representing a group of sub-objects, and zooming in on a data element may result in a presentation of the sub-object, with possibly more levels of zooming to support additional navigation to even deeper constituent parts. For example, a first scene 12 may represent a university as a set of departments as visual elements 16, and zooming in on a department may result in a presentation of a second scene 12 representing the details of the department (such as the current set of course listings and faculty members), and zooming in still further may result in a detailed presentation of a particular faculty member (such as his or her curriculum vitae and class schedule) or a particular course (such as a course description).

In these and other ways, the zoom operation is presented as a semantic not of the physical depth of visual elements 16 within the scene 12, but for alternative semantics, such as user interest in and selection of a visual element 16, a "drill-down" or "expand" operation to display additional detail about a visual element 16, or navigation through a hierarchical data set from a parent element to a child element contained therein. However, it may be helpful to represent the transition within the scene 12 from a first zoom state 14 to a second zoom state 14 as a depth-based zoom, even if the effect on the visual elements 16 represented therein is not a depth-based zoom resulting in different visual dimensions and visual resolution. For example, upon receiving a zoom operation 18, the device rendering the scene 12 may render a visual zoom into or out of the scene 12 as a transition between a first zoom level 14 and a second zoom level 14. However, the zoom operation 18 may cause a different effect than a visual-depth-based zoom with respect to a visual element 16, such as selection of the visual element 16, a "drill-down" or "expand" operation that adds data, navigation to a deeper or shallower level of a hierarchical data set, or navigation to a related but different set of data (e.g., navigating to the target of a hyperlink by zooming in on the hyperlink). This combination may be helpful, e.g., for preserving the visual "zoom" concept as a familiar and intuitive navigational semantic within the depth of the represented visual elements 16, while also applying the "zoom" operation to the visual elements 16 not as a visual-depth-based semantic that results in changes to the visual dimensions and/or resolution of the visual elements 16, but for alternative semantics regarding the visual elements 16.

Figure 2:
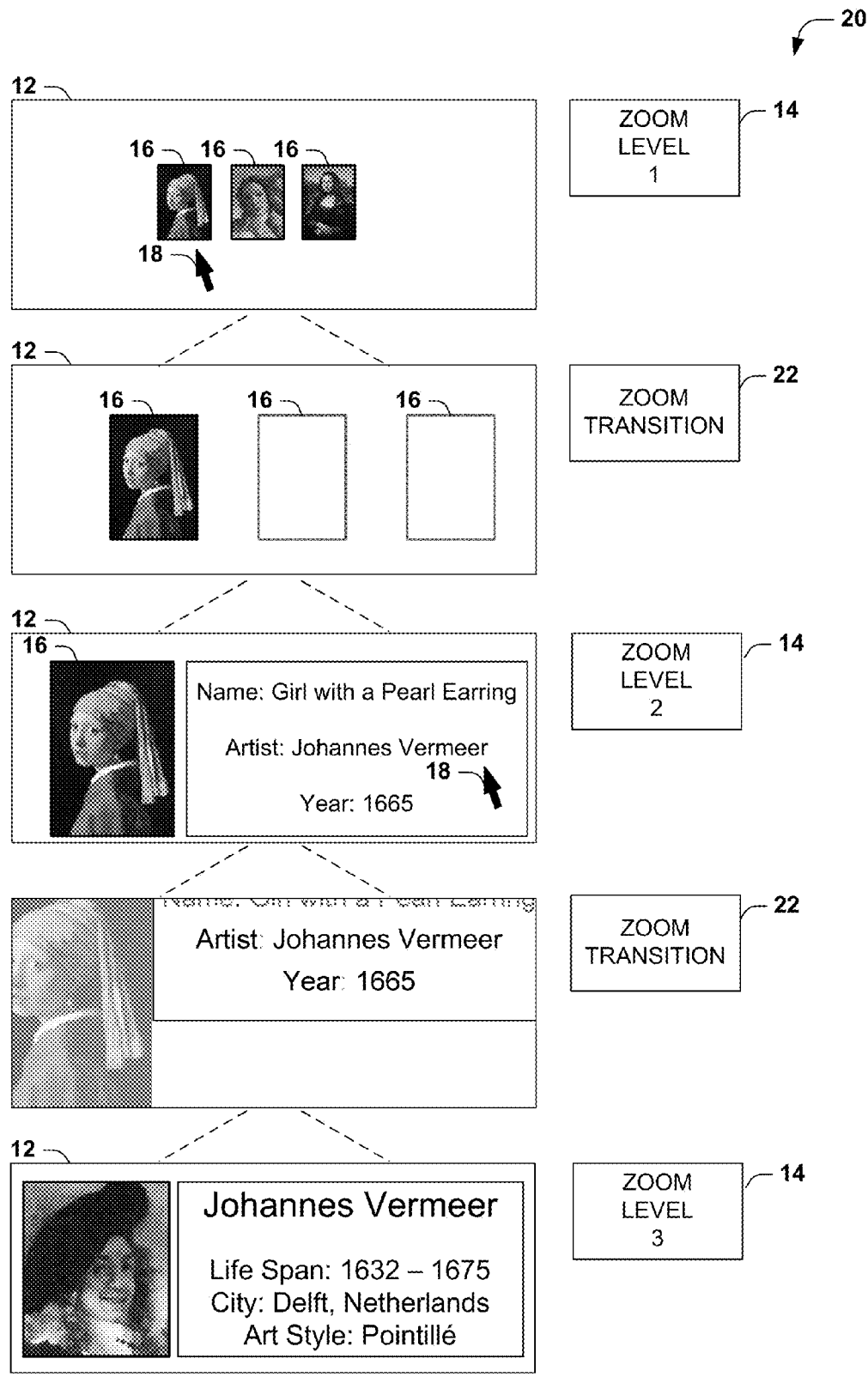
FIG. 2 is an illustration of a first exemplary scenario featuring a zoomable scene using an alternative semantic for a zoomable operation in accordance with the techniques presented herein.

FIG. 2 presents an illustration of an exemplary scenario 30 featuring a zoomable scene 12 wherein a zoom operation 14 applied to a scene 12 results in visual differences in a visual element 14 other than differences of visual dimension and visual resolution. This exemplary scenario 30 again features a scene 12 comprising a set of visual elements 16 that represent the images of an image set, which, at a first zoom level 14, are presented at a low level of quality with small visual dimensions, and possibly at a low visual resolution, or with less information (e.g., as a simplified graphic or with some textual information removed). As a first example, when a first zoom operation 18 may be received (e.g., from a user, an automated script, or another application) requesting to zoom in on a first visual element 16, a first visual zoom transition 22 may be rendered upon the scene 12, such as expanding the visual elements 16 as a visual indication of a depth-based navigation within the scene 12. However, in accordance with the techniques presented herein, the zoom operation 18 causes a visual effect on the visual element 16 other than a change of visual dimensions and/or visual resolution; i.e., at the second zoom level 14, an information set may be presented that relates to the zoomed-in visual element 16, such as the name year of creation, and artist who created an artwork depicted by the visual element 16. This visual difference may be interpreted as a selection of the zoomed-in visual element 16, and/or as a "drill-down" operation upon the visual element 16 to view additional information relating to the visual element 16. This visual difference may also be illustrated during the visual zoom; e.g., if the zoom operation 18 is interpreted as a selection of the first visual element 16, the other visual elements 16 within the scene 12 may fade out of the scene 12 during the first visual zoom transition 22.

As a second example of the techniques presented herein, when a second zoom operation 18 is received that requests to zoom in on the name of the artist of the artwork depicted in the zoomed-in visual element 16, a second visual zoom transition 22 may be rendered, such as visually expanding the name of the artist (while fading out the other visual elements 16 of the scene 12), and resulting in a third zoom level 14 comprising a brief biography of the artist of the artwork. The second zoom operation 18 therefore represents a conceptual navigation within an information hierarchy represented by the scene 12. Moreover, in contrast with the first zoom operation 18 that results in a supplementing of the information about a zoomed-in visual element 16 (e.g., additional details about the artwork depicted in the visual element 16), this conceptual navigation results in a presentation of a completely different set of information; i.e., the biography of the artist does not particularly relate to the artwork represented in the visual element 16 to which the zoom operation 18 was applied, but instead allows the user to navigate within the information set associated with the visual element 16 to a different information set. However, the navigation semantic of conceptual depth may be promoted through the rendering of the visual zoom transitions 22. Additionally, reverse zoom operations 18 (e.g., "zoom out") may be invoked to reverse the conceptual depth navigation within the information set, e.g., to transition from the third zoom level 14 back to the second zoom level 14 and then back to the first zoom level 14. These reverse zoom operations 18 may also be supported through the rendering of visual zoom transitions 22 (e.g., "zoom out" visual transitions that return the view of the scene 12 to a previous state, and a "fade-in" to cause visual elements 16 that were not visible at the higher zoom level 14 to appear in the scene 12 at the lower zoom level 14).

Figure 3:
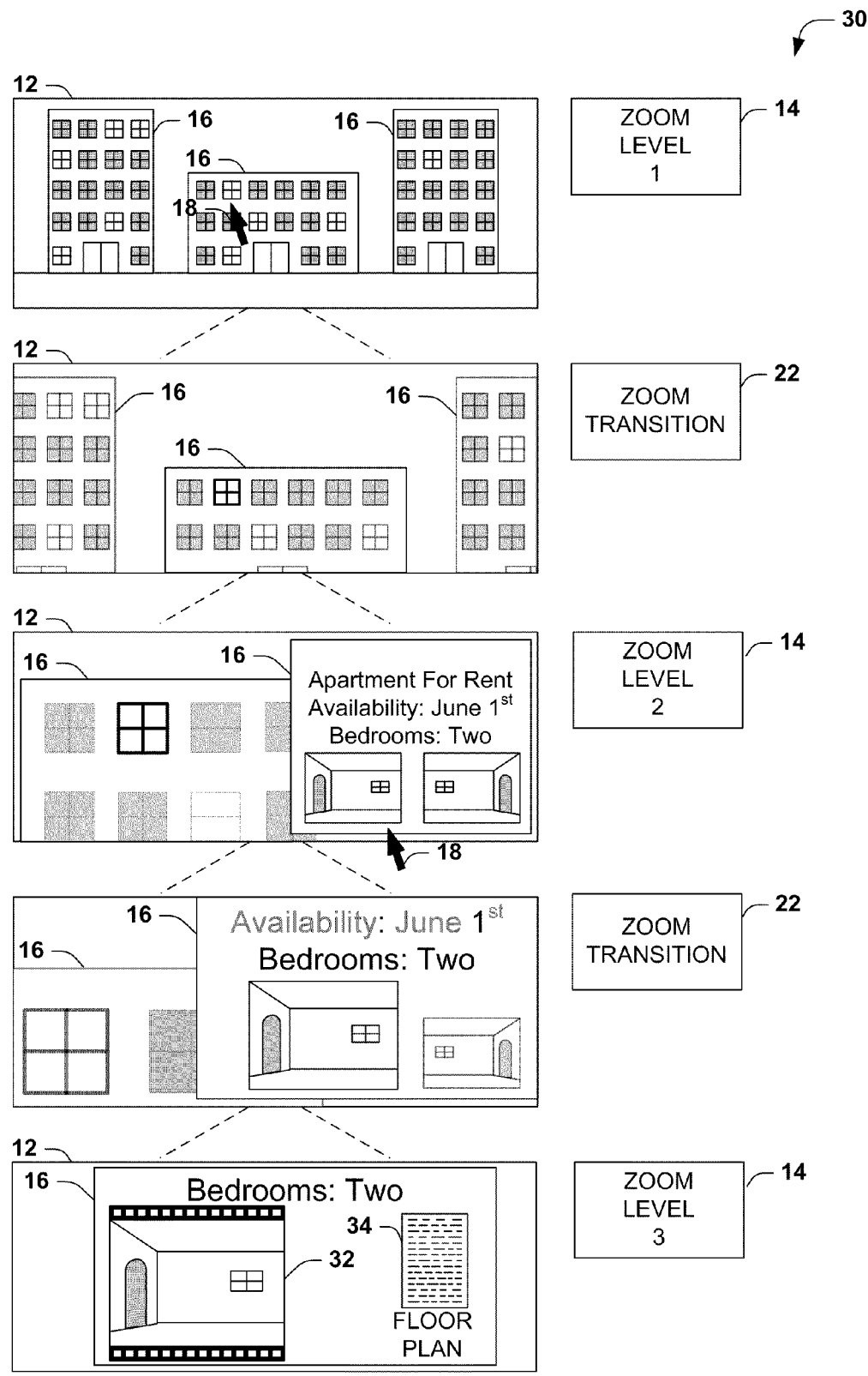
FIG. 3 is an illustration of a second exemplary scenario featuring a zoomable scene using an alternative semantic for a zoomable operation in accordance with the techniques presented herein.

FIG. 3 presents a second exemplary scenario 30 featuring the application of zoom operations 18 to the visual elements 16 of a zoomable scene 12 that, in accordance with the techniques presented herein, result in a visual difference to such elements 16 other than a difference of visual dimensions and/or visual resolution. In this exemplary scenario 30, the scene 12 comprises an interface to a rental property database, such as a set of residential properties that are available for leasing. A first zoom level 14 of the scene 12 may present (as visual elements 16) a view of a neighborhood comprising a set of residential properties, where available rental units (such as apartments) are illustrated as having bright or unshaded windows, and unavailable rental units are illustrated as having dark or shaded windows. Upon receiving a first zoom operation 18 requesting to zoom in on a particular rental unit, a device configured to render the scene 12 may render a first visual zoom transition 22 that zooms in on the selected rental unit, and that also fades out the other visual elements 16 to remove unrelated clutter from the visual rendering of the scene 12. The first visual zoom transition 22 may conclude with a rendering of the scene 12 at a second zoom level 14, comprising a second visual presentation of the visual element 16 that visually differs from the first visual presentation by including some additional information about the rental unit (e.g., the type of rental unit, the date of availability, and the number of bedrooms). In addition, the second visual presentation of the visual element 16 may include a set of images of various rooms within the rental unit. Upon receiving a second zoom operation 18 focusing on a particular photograph of a room, the device may render a second visual zoom transition 22 that zooms in on the photograph (and fades out the other visual elements 16 to reduce clutter in the presentation of the scene 12), and at the third zoom level 14 may present additional information about the room. In particular, the third visual presentation of this visual element 16 at the third zoom level 14 may include different types of data objects than present in the second visual presentation of the same visual element 16 at the second zoom level 14. For example, in place of the image of the room, a video 32 may presented that displays a panoramic view or walk-through of the room, and a floor plan 34 that indicates the layout and spatial dimensions of the room. These data objects may be rendered within the visual element 16 within the scene 12 (e.g., the video 32 may be played in situ within the visual element 16, such as within an object-specific application that renders a visual user interface and/or output directly within the visual element 16 in the scene 12), or may be rendered outside of the visual element 16 and/or the scene 12 (e.g., the floor plan 34 may be opened as a document viewed in a completely separate application, such as a 3D Computer-Aided Design (CAD) application). In this manner, the exemplary scenario 30 of FIG. 2 presents the application of a set of zoom operations 18 to a zoomable scene 12 that result in both visual zoom transitions 22 between the zoom levels 14 to promote the "zoom" semantic, and also visual presentations of the visual elements 16 that are based not on visual differences in visual dimensions and/or visual resolutions, but rather different semantics of the zoom operation 18, such as a request to select the visual element 16, to present more or less information about the visual element 16, and/or to navigate within an information hierarchy with which the visual element 16 is associated. These and additional advantages may be achieved through the application to the visual elements 16 of the zoomable scene 12 of the techniques presented herein.

Figure 4:
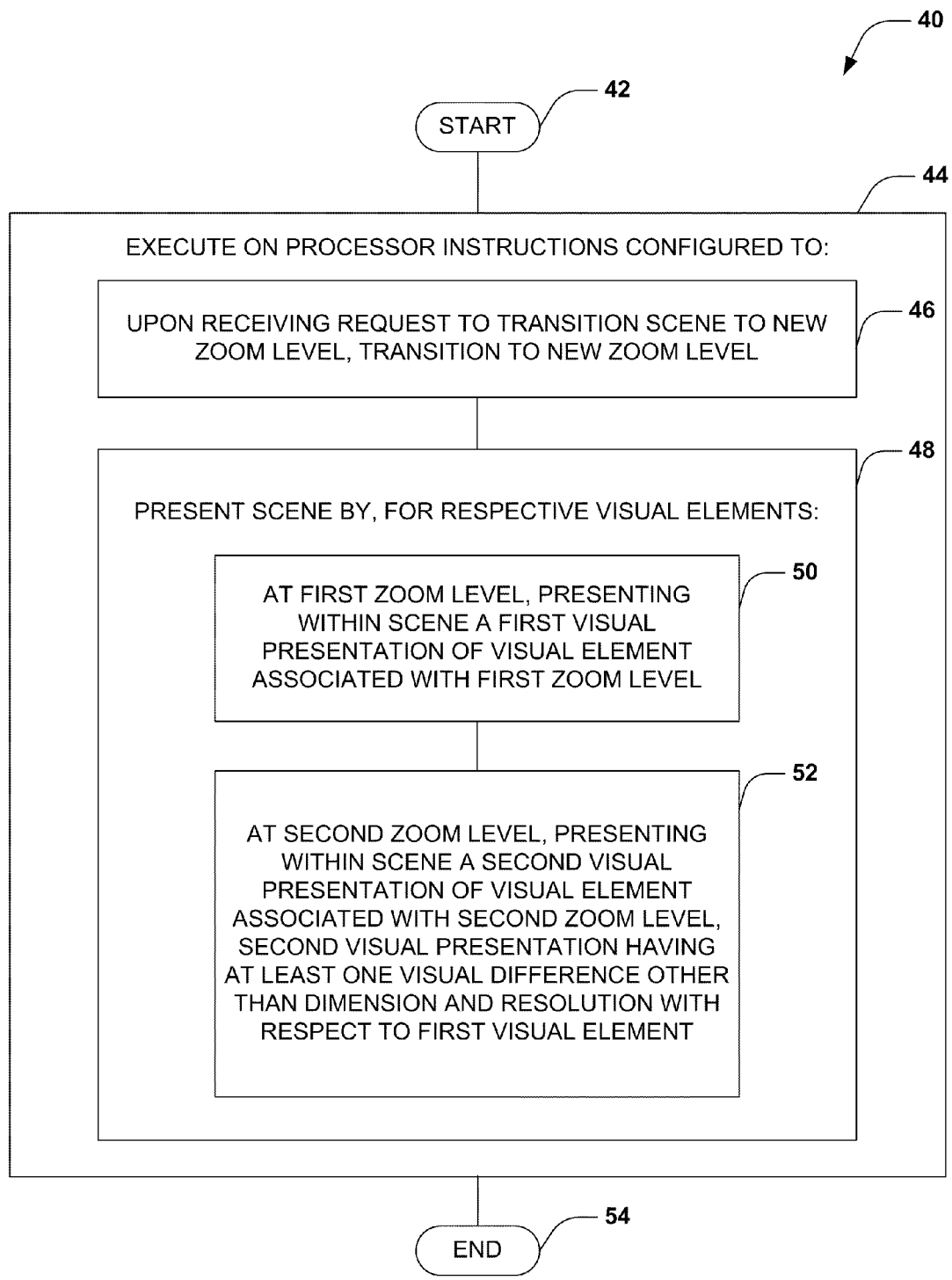
FIG. 4 is a flow chart illustrating an exemplary method of presenting, within a scene having a zoom level, at least one visual element having at least two visual presentations.

FIG. 4 presents a first embodiment of the techniques presented herein, illustrated as an exemplary method 40 of presenting, within a scene 12 having a zoom level 14, at least one visual element 16 having at least two visual presentations. The exemplary method 40 may comprise, e.g., a set of software instructions stored in a volatile or non-volatile memory component (such as system memory, a hard disk drive, a solid-state storage device, or a magnetic or optical disc) of a device having a processor. The exemplary method 40 begins at 42 and involves executing 44 on the processor instructions configured to perform the techniques presented herein. In particular, the instructions are configured to, upon receiving a zoom operation 18 transitioning the scene 12 to a new zoom level 14, transition 46 the scene 12 to the new zoom level 14. The instructions are also configured to present 48 the scene 12 by presenting different visual presentations for respective visual elements 16. In particular, at a first zoom level 14, the instructions are configured to present 50 within the scene 12 a first visual presentation of the visual element 16 that is associated with the first zoom level 14; and at a second zoom level 14, the instructions are configured to present 52 within the scene 12 a second visual presentation of the visual element 16 that is associated with the second zoom level 14, where the second visual presentation has at least one visual difference other than visual dimension and visual resolution with respect to the first visual presentation. In this manner, the exemplary method 40 achieves a visual presentation of the visual elements 16 of the scene 12 that, at different zoom levels 14, exhibit visual presentations that differ in ways other than visual dimensions and visual resolution, thereby presenting a different zoom semantic than the conventional visual-depth-based zoom semantic. Having achieved this presentation, the exemplary method 40 ends at 54.

Figure 5:
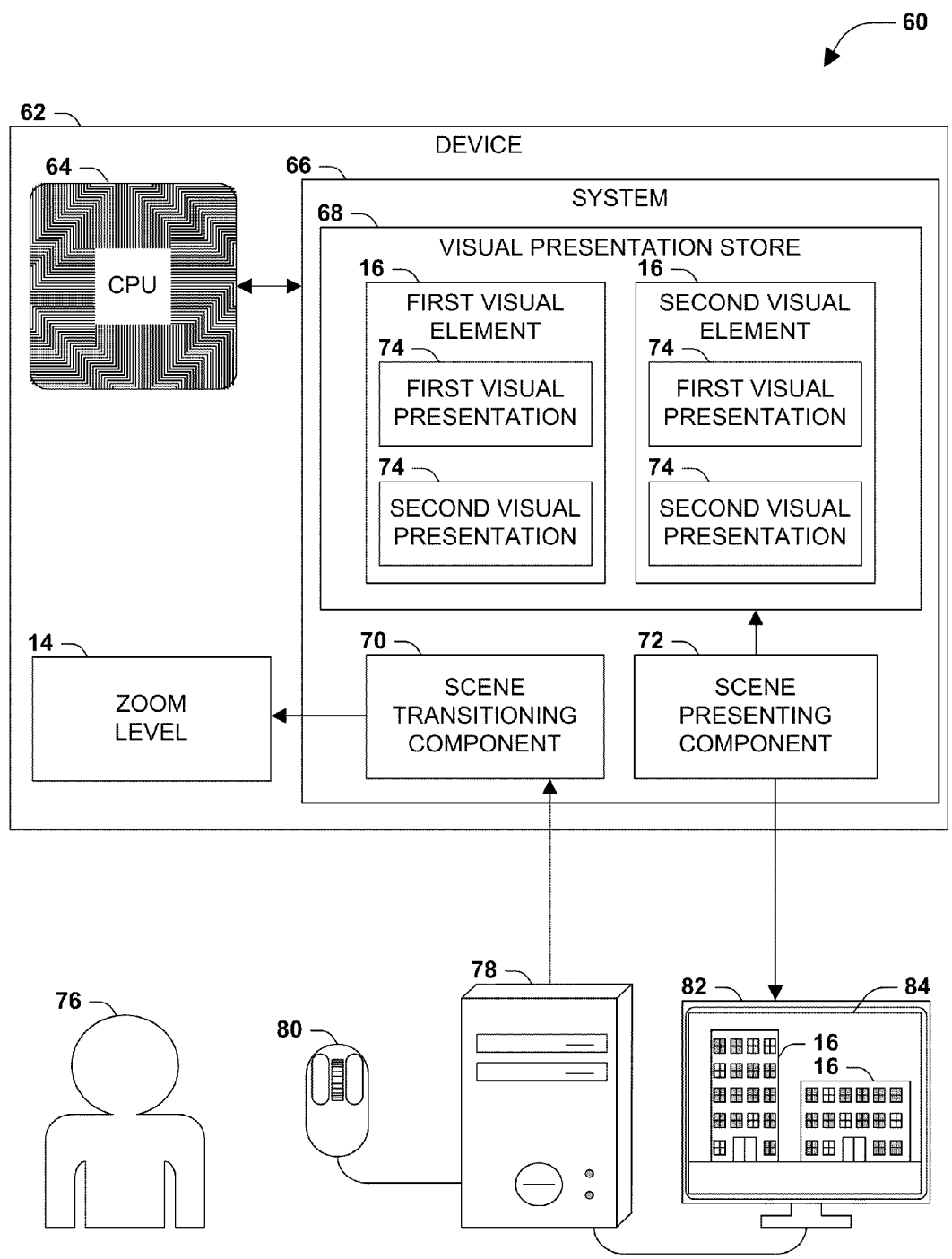
FIG. 5 is a component block diagram illustrating an exemplary system for presenting, within a scene having a zoom level, at least one visual element having at least two visual presentations.

FIG. 5 presents a second embodiment of the techniques presented herein, illustrated as an exemplary system 66 configured to present at least one visual element 16 within a scene 12 having a zoom level 14. This exemplary system 66 functions within a device 62 having a processor 64, and that is configured to (in this exemplary scenario 60) communicate with a user 76 of a user device 78 having one or more input components 80 (such as a mouse) and one or more display components 82 (such as an LCD display). The exemplary system 66 may be implemented, e.g., as a software architecture comprising a set of interoperating software components, each comprising a set of instructions stored in a memory component (such as system memory, a hard disk drive, a solid-state storage device, or a magnetic or optical disc) of the device 62 and configured to be executed by the processor 64 of the device. Each interoperating component of the software architecture may be configured to perform a particular task, and to this end, may be configured to interact with the other components of the software architecture to perform the techniques presented herein.

The exemplary system 66 of FIG. 5 comprises a visual presentation store 68, which is configured to store, for respective visual elements 16, at least two visual presentations 74 that are respectively associated with a particular zoom level 14 of the scene 12. For example, the visual presentation store 68 may store, for a first visual element 16, a first visual presentation 74 whereby the first visual element 16 may be presented at a first zoom level 14 (including a first range of zoom levels 14), and a second visual presentation 74 whereby the first visual element 16 may be presented at a second zoom level 14 (including a second range of zoom levels 14). Additionally, in accordance with the techniques presented herein, the second visual presentation 74 differs from the first visual presentation 74 by a visual difference other than visual dimension(s) and/or visual resolution. The exemplary system 66 also comprises a scene transitioning component 70, which is configured to, upon receiving a zoom operation 18 transitioning the scene 12 to a new zoom level 14 (e.g., an operation performed by the user 76 using an input component 80 of the user device 78), transition the scene 12 to the new zoom level 14. The exemplary system 66 also comprises a scene presenting component 72, which is configured to present the visual elements 14 of the scene 12. In particular, at a first zoom level 14 of the scene 12, the scene presenting component 72 presents, for respective visual elements 16, a first visual presentation 74 of the visual element 16 selected from the visual presentation store 68 that is associated with the first zoom level 14; and, at a second zoom level 14, presents within the scene a second visual presentation of the visual element associated with the second zoom level, the scene presenting component 72 presents, for respective visual elements 16, a second visual presentation 72 selected from the visual presentation store 68 that is associated with the second zoom level 14, and that also has at least one visual difference other than visual dimension and visual resolution with respect to the first visual presentation 74 of the visual element 16. The presentation of the various visual presentations 72 of the visual elements 16 of the scene 12 may be generated and presented to the user 76, e.g., for displaying 84 on the display component 82 of the user device 78. In this manner, the exemplary system 66 achieves the presentation of visual elements 16 within the zoomable scene 16 according to a zoom semantic other than a visual-depth-based zoom semantic, in accordance with the techniques presented herein.

Figure 6:
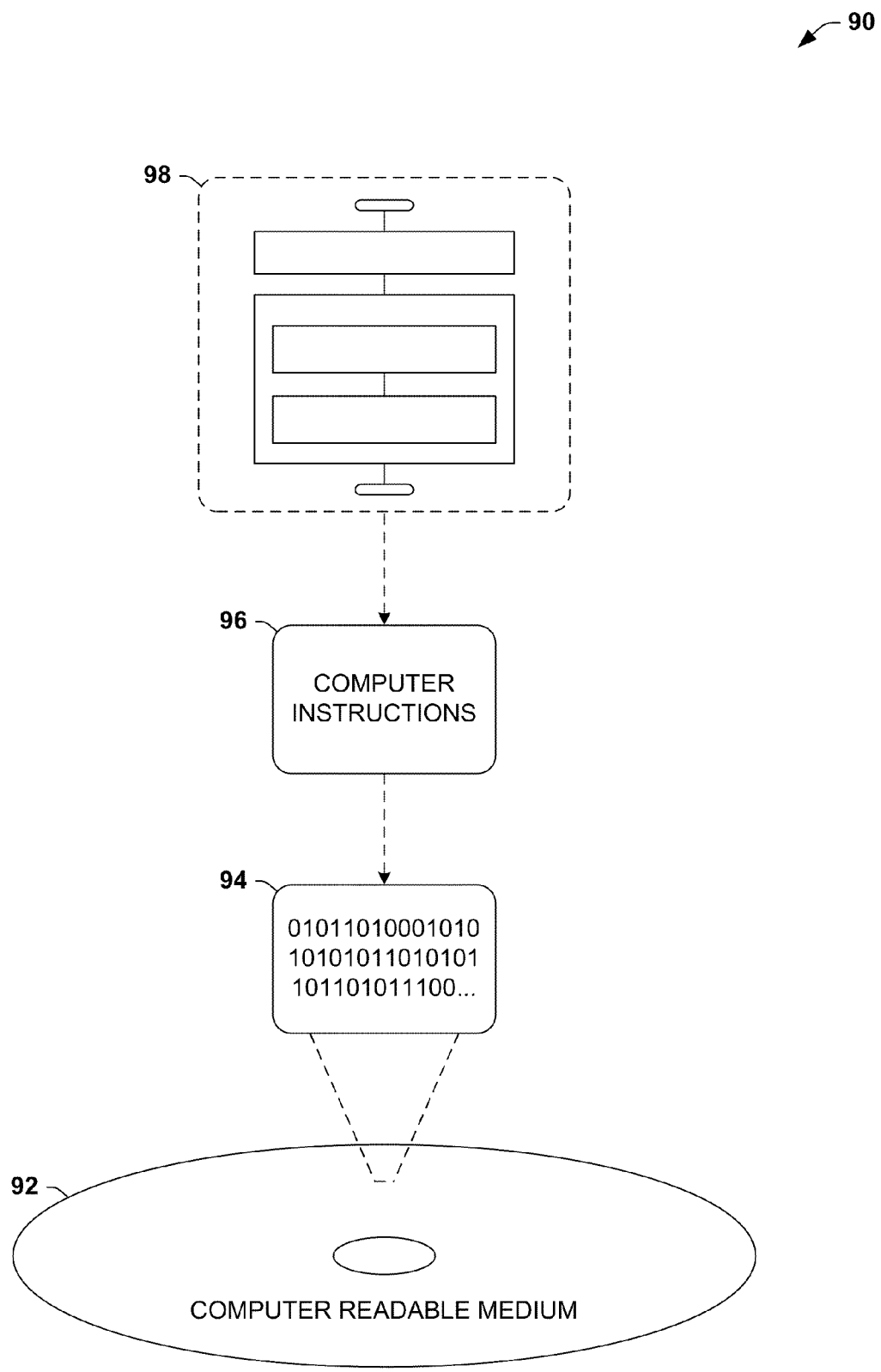
FIG. 6 is an illustration of an exemplary computer-readable medium comprising processor-executable instructions configured to embody one or more of the provisions set forth herein.

Still another embodiment involves a computer-readable medium comprising processor-executable instructions configured to apply the techniques presented herein. An exemplary computer-readable medium that may be devised in these ways is illustrated in FIG. 6, wherein the implementation 90 comprises a computer-readable medium 92 (e.g., a CD-R, DVD-R, or a platter of a hard disk drive), on which is encoded computer-readable data 94. This computer-readable data 94 in turn comprises a set of computer instructions 96 configured to operate according to the principles set forth herein. In one such embodiment, the processor-executable instructions 96 may be configured to perform a method of presenting, within a scene having a zoom level, at least one visual element having at least two visual presentations, such as the exemplary method 40 of FIG. 4. In another such embodiment, the processor-executable instructions 96 may be configured to implement a system for presenting, within a scene having a zoom level, at least one visual element having at least two visual presentations, such as the exemplary system 66 of FIG. 5. Some embodiments of this computer-readable medium may comprise a non-transitory computer-readable storage medium (e.g., a hard disk drive, an optical disc, or a flash memory device) that is configured to store processor-executable instructions configured in this manner. Many such computer-readable media may be devised by those of ordinary skill in the art that are configured to operate in accordance with the techniques presented herein.

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments (e.g., the exemplary method 40 of FIG. 4 and the exemplary system 66 of FIG. 5) to confer individual and/or synergistic advantages upon such embodiments.

A first aspect that may vary among embodiments of these techniques relates to the scenarios wherein these techniques may be utilized. As a first example, these techniques may be utilized to generate a visual presentation of many types of scenes 12 representing many types of visual elements 16, such as data sets comprising images, audio or video recordings, documents, facts, data objects, or other forms of data; maps of various types of objects and/or locations; and elements of an information hierarchy (such as the set of rental properties depicted in the exemplary scenario 30 of FIG. 3). As a second example of this first aspect, many types of visual presentations of a scene may be utilized, such as various two-dimensional or three-dimensional representations (including a top or aerial view, a front view, a side or profile view, or an isometric view), or a simulated view of an information hierarchy, where the zoom level 14 represents a hierarchical level within the information hierarchy, and where the visual elements 16 of the scene 12 depict the elements within the hierarchical level (e.g., the nodes at a particular level of a tree view of a tree hierarchy).

As a third example of this first aspect, many types of visual zoom transitions 22 may be utilized as a visual indication to the user 76 of the type, direction, focus, and extent of the zoom. In a first such variation, a visual zoom transition 22 may be visually represented as a continuous zoom, comprising a continuous set of incremental, visual-depth-based view changes from the first zoom state 14 to the second zoom state 14, where visual elements 16 change in visual dimensions and resolution. In a second such variation, a visual zoom transition 22 may be visually represented as a discrete step, wherein the view rapidly changes from the first zoom state 14 to the second zoom state 14 with few or no intermediate transitional view stages. In a third such variation, a visual zoom transition 22 may be visually represented by rendering a zoomed-in visual element 16 to grow to fill the entire scene 12 (while possibly leaving the other visual elements 16 and the remainder of the scene 12 at the same proportions). In a fourth such variation, a visual zoom transition 22 may be visually represented as a cross-fading effect, wherein the view of the scene 12 at the first zoom level 14 fades out as the view of the scene 12 at the second zoom level 14 concurrently fades in. In a fifth such variation, a visual zoom transition 22 may be visually represented as a depth-of-field effect, wherein visual elements 16 that are within a focal depth of the scene 12 based on the zoom level 14 are presented in sharp focus, and visual elements 16 at other focal depths of the scene 12 are presented as unfocused or blurry. Moreover, variations or combinations of these exemplary visual zoom transitions 22 may be utilized in different contexts (e.g., a continuous visual zoom transition 22 might be rendered to connote a "drill-down" operation that adds data to a data set, while a blur visual zoom transition 22 might be rendered to connote a navigation within the visual element 16 from a first data set to a second data set that is associated with, but not necessarily related to, the first data set, such as in the second visual zoom transition 22 in the exemplary scenario 20 of FIG. 2.)

As a fourth example of this first aspect, variations may be selected in the design of various implementations of embodiments of these techniques. As a first variation, while the exemplary method 40 depicts one such factoring and ordering of elements of a method embodiment of these techniques, other factorings and orderings may be devised, and some may present advantages with respect to other factorings and orderings. In one such embodiment, the retrieval of visual presentations 74 of various visual elements 16 (e.g., from a visual presentation store 68) might be achieved apart from the rendering of the scene 12 at a zoom level 14; e.g., a visual presentation cache may be devised to store visual presentations 74 of visual elements 16 that may imminently be utilized to render a scene 12 at a particular zoom level 14. As a second variation, the exemplary system 66 may be incorporated into a device 62 configured to present various renderings of the scene 12 to a user device 78 for presentation on the display component 82; e.g., the device 62 may comprise a webserver of a property rental agency, and may present to visitors of the website a rental property database regarding the availability and details of various rental properties, and may therefore generate and present for rendering by a web browser on the user device 78 various renderings of a scene 12 representing the rental property database at various zoom levels 14. Alternatively, the exemplary system 66 might be implemented within the user device 78, e.g., in order to present a conventional database presented by a property rental agency as a zoomable interface that promotes navigation through the hierarchical data contained therein.

As a fifth variation of this first aspect, the zoom operation 18 may be controlled in many ways. As a first such variation, the zoom operation 18 may be received from a user and/or from an automated process, such as another application or a script that controls the position of the viewport within the scene 12. As a second such variation, the zoom operation 18 may be controlled in many ways, such as by specifying or adjusting the focal point of the zoom operation 18 within the scene 12, the speed of the zoom operation 18 (e.g., specifying a rate of change of the viewpoint; the number of levels through a navigation of a hierarchy presented in the scene 12; or a transition to a specific zoom level 14 within the scene 12, such as a transition to a particular scene context or a particular point in a hierarchically structured data set presented within the scene 12). Those of ordinary skill in the art may devise many scenarios wherein various implementations of the techniques presented herein may be utilized.

A second aspect that may vary among embodiments of these techniques relates to variable characteristics and uses of the zoom level 14 of the scene 12. As a first example, for a particular visual element 16, many types of visual differences may be included in different visual presentations 74 of the visual element 16 at different zoom levels 14 of the scene 12. In a first such variation, the first visual presentation 74 may comprise a content set, and the second visual presentation 74 may comprise a different content set; e.g., a visual element 16 representing the collected works of a particular artist may feature at different zoom levels 16 different artworks created by the artist at different times. In this variation, the zoom level 14 may semantically represent a chronology selector for the chronology of the items represented in the visual element 16. In a second such variation, the first visual presentation 74 may comprise a visual style, and the second visual presentation 74 may comprise a different visual style; e.g., a visual element 16 may present a simplified view of a user interface or data set at a first zoom level 14, and a more sophisticated view of the user interface or data set at a different zoom level 14. In this variation, the zoom level 14 may semantically represent a selector of various user interfaces of different levels of complexity for the visual element 16. In a third such variation, the first visual presentation 74 may comprise a data object of a data object type, and the second visual presentation 74 may comprise a data object of a different data object type; e.g., a numeric data set may be presented at a first zoom level 14 as a chart, and at a second zoom level 14 as a spreadsheet. In this variation, the zoom level 14 may semantically represent a selector for various views of the visual element 16. In a fourth such variation, the first visual presentation 74 may comprise a visual element functionality, and the second visual presentation 74 may comprise a different visual element functionality; e.g., a visual element 16 representing a document may permit the user to navigate through the document at a first zoom level, but to edit a particular portion of the document upon zooming in on the portion. In this variation, the zoom level 14 may semantically represent a functionality selector for the visual element 16.

As a second example of this second aspect, the zoom level 14 may be used to represent various contexts of the scene 12. A non-contextual use of the zoom level 14 of the scene 12 might arise, e.g., where the visual elements 16 of the scene 12 are comparatively unrelated, such as a collection of unrelated files in a file system. However, some scenes 12 might utilize the zoom level 14 as a contextual metaphor, where different zoom levels 14 may represent different contexts of the interaction of the user 76 with the concepts represented by the scene 12. The exemplary scenario 30 of FIG. 3 presents one such contextual use of the zoom level 14 as a contextual metaphor, wherein the scene 12 represents a hierarchically structured information set. The first zoom level 14 represents a neighborhood-level context of the interaction of the user 76 with the information set, while a second level 14 represents a unit-level context of the interaction of the user 76 with the information set, and a third level 14 represents a room-level context of the interaction of the user 76 with the information set. Additional zoom levels 14 might represent different contexts; e.g., a zoom level 14 at a lower level than the first zoom level 14 might contextually represent a set of property rental agencies or a set of regions (such as cities) where rental properties may be available, and a zoom level 14 at a higher level than the third zoom level 14 might represent a transaction between the user 76 and the rental property agency relating to a leasing agreement of the rental property zoomed in by the user 76 at the second zoom level 14 and the third zoom level 14. Moreover, in some variations, different visual elements 16 may specify be associated with different sets of contexts for different sets of zoom levels 14; e.g., a first visual element 16 may have different visual presentations 74 representing different contexts at a first zoom level 14 and a second zoom level 14 within the scene 12, while a second visual element 16 may have different visual presentations 74 representing different contexts at the first zoom level 14 and a third zoom level 14.

As a third example of this second aspect, the association of various contexts with various zoom levels 14 of the scene 12 may affect the design and use of the user interface configured to present the zoomable scene 12. One such user interface may permit a free exploration of the zoomable scene 12 by the user 76 (e.g., an unrestricted capability to pan, tilt, rotate, and/or zoom the view within the scene 12), and when the user 76 arrives at a zoom level 14 (e.g., zooming in at a particular magnitude on a particular visual element 16), the user interface may adjust the visual presentation to indicate the scene context of the zoom level 14. Another user interface may constrain the selection of the zoom level 14 (and possibly other aspects, such as panning capabilities), such that the zoom level of the scene 14 is always associated with a particular scene context of the scene 12. For example, in the exemplary scenario 30 of FIG. 3, a user 76 may be permitted to explore the zoomable scene 12 freely, and the user interface may present a particular scene context of the scene 12 (such as an inquiry into the availability and details of a particular rental unit, such as the scene context of the second zoom level 14) if and when the user 76 transitions the scene 12 to a corresponding zoom level 14. Alternatively, the exemplary scenario 30 of FIG. 3 may constrain the zooming navigation within the scene 12 to zoom levels 14 having a particular scene context, and may transition to a new zoom level only if the new zoom level represents a scene context of the scene 12. For example, if the user 76 performs a zoom operation 18 indicating zooming into a particular area of the scene 12, an embodiment of these techniques may either identify the zoom level 14 nearest the zoom level 14 indicates by the zoom operation 18 that represents a scene context, or may simply refuse the zoom operation 18 if it is not sufficiently close to any zoom level 14 associated with a scene context. (In the latter case, the user interface might detect that the user 76 is having difficulty navigating within the scene 12, and may display suggestions or hints, such as visual indicators of valid locations for zoom operations 18 within the scene 12.) Moreover, in scenarios featuring two or more visual elements 16 having disjoint sets of contexts represented at different zoom levels 14, the embodiment may constrain the zoom level 14 of the scene 12 to the zoom levels 14 associated with the contexts for a particular visual element 16 upon which the user may have selected.

Figure 7:
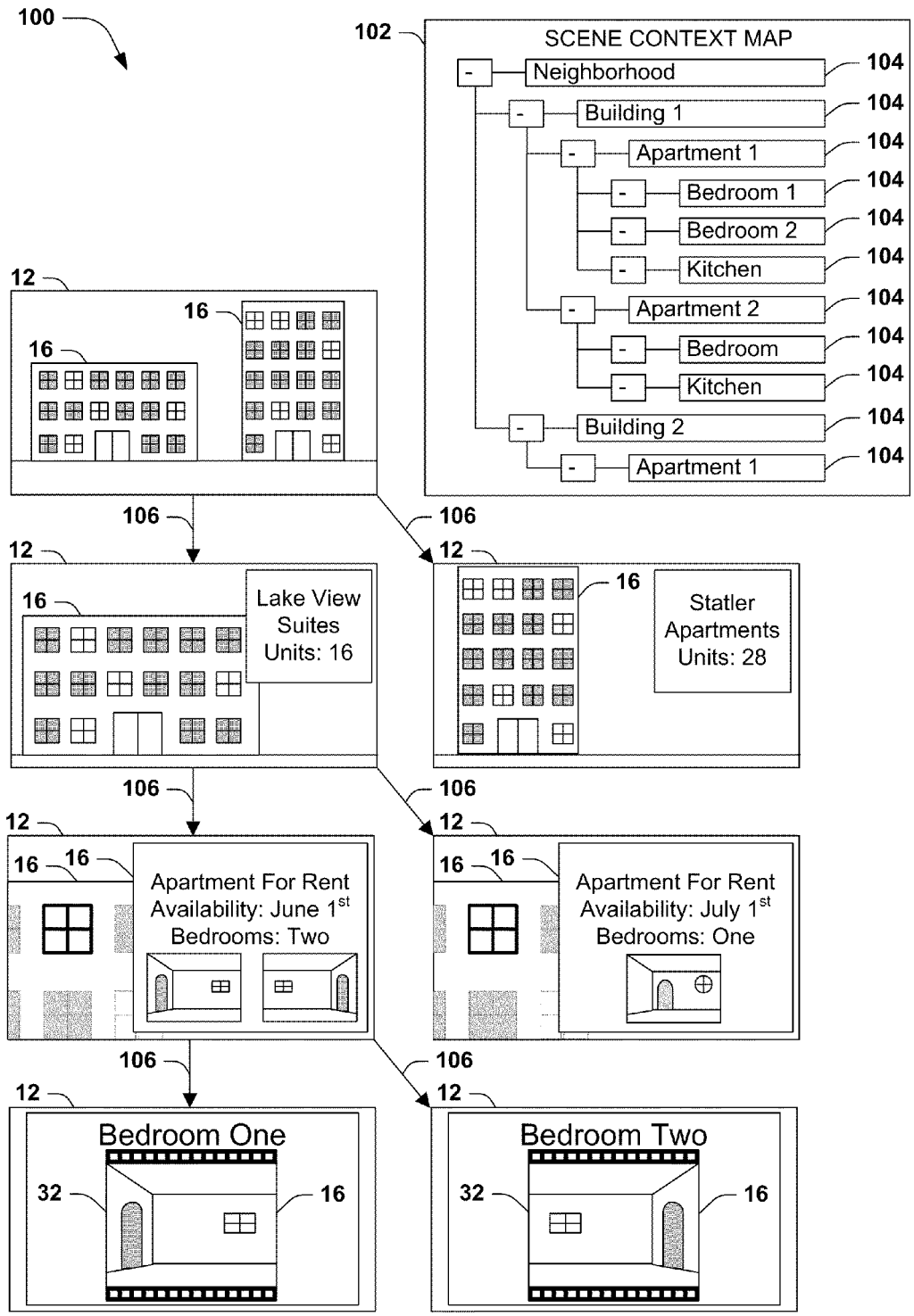
FIG. 7 is an illustration of an exemplary scenario featuring a zoomable scene having respective zoom levels associated with a scene context.

FIG. 7 presents an illustration of an exemplary scenario 100 featuring a zoomable scene 12 where the zoom semantic is associated with a scene context of the scene 12, and, moreover, where navigation within the scene 12 is constrained to zoom levels 14 that are associated with various scene contexts. In this exemplary scenario 100, the zoomable scene 12 is associated with a scene context map 102, comprising a hierarchical data set (such as a set of hierarchically structured nodes 104 that are visually represented as a tree view) that indicates, at a particular zoom level 14, the deeper zoom levels 14 that are available within the zoom level 14 and that are associated with different scene contexts. For example, at a first zoom level 14 (represented as the root node of the scene context map 102), the scene 12 represents the context of a neighborhood. Within the context of the neighborhood, according to the scene context map 102, two second zoom levels 14 are available that are associated with visual elements 16 respectively representing the scene context of a building within the neighborhood. A user 76 may therefore be permitted, at this first zoom level 14, to zoom in (only) on the areas of the scene 12 that are associated with each visual element 16. (For example, the scene context map 102 may indicate, in each second-level hierarchically structured node 1094 within the root note, the ranges of pixel coordinates within the visual depiction of the scene 12 in which inward zoom operations 18 are valid, and the particular visual element 16 associated with each zoom operation 18.) At a second zoom level 14 for the first visual element 16, the scene context map 102 may indicate that two third zoom levels 14 are available that respectively represent the scene context of a particular rental unit within the building; and at a fourth zoom level 14 for a rental unit selected within the building represented by the first visual element 16, the scene context map 102 may indicate that two fourth zoom levels 14 are available that respectively represent the scene context of a particular room within the selected rental unit. In this manner, the navigation of the user 76 through the zoomable scene 12 in the exemplary scenario 100 of FIG. 7 is constrained to the scene contexts represented in the scene context map 102 in order to promote the contextual relevance of any particular zoom level 14 to the user 76. Those of ordinary skill in the art may devise many semantics and uses of the zoom level 14 of a zoomable scene 12 while implementing the techniques presented herein.

A third aspect that may vary among embodiments of these techniques relates to the visual presentations 72 that are selected for a visual element 16 when the zoom level 14 of the scene 12 is (and is not) within a proximity of the visual element 16. For example, whether or not a zoomable scene 12 constrains the zoom level 14 to various scene contexts, a zoom level 14 may be selected that has a proximity to a particular visual element 16 (e.g., zooming in on a particular visual element 16 such that it fills or nearly fills the display component 82 of the user device 78.) The proximity of the zoom level 14 to the visual element 16 may indicate a particular semantic action of the user 76 regarding the visual element 16; e.g., the user 76 may have selected the zoom level 14 in order to express an intent to examine the visual element 16, to select the visual element 16, and/or to interact with the visual element 16. Accordingly, for a first zoom level 14 that does not comprise a view proximity zoom level regarding the visual element 16, a corresponding first visual presentation 74 may comprise a distant version of the visual element 16; and for a second zoom level 14 that comprises a view proximity zoom level regarding the visual element 16, a second visual presentation 74 may comprise a proximate version of the visual element 16.

This semantic use of the zoom level 14 and the corresponding selection of visual elements 16 may result in many uses. As a first example, where a visual element 16 represents a media object, the first visual presentation 74 (representing a distant version of the visual element 16) may comprising a preview version of the media object, and the second visual presentation 74 comprising a presentation version of the media object. This variation might be presented, e.g., in the exemplary scenario 30 of FIG. 3, where the third zoom level 14 includes a video 32 depicting a room of a rental unit, and where the second zoom level 14 includes a thumbnail image that might have been captured from the video 32 (or a lower-quality or brief segment of the video 32), and that might comprise a preview version of the video 32 that may suggest an offer for the presentation version of the video 32 if the user 76 performs a zoom operation 18 upon the preview version.

As a second example of this third aspect, one or more visual elements 16 may involve a computational process, which may relate to the data or concepts represented by the visual element 16 and/or the context of the visual element 16 within the scene 12. For example, a visual element 16 representing a data object may involve persistent updating of the visual presentation 74 of the data object to reflect the current state of the data object; a visual element 16 representing a playing media object (such as an audio or video recording) may involve a rendering of the frames of the media object (such as a decompressing of the media stream using a codec); and a visual element 16 representing a set of data retrieved from a data source may involve periodically refreshing the data from the data source to reflect fresh data. In these scenarios, it may be advantageous to perform the computational processing of respective visual elements 16 based on the zoom level 14, and in particular, based on the proximity of the zoom level 14 to the respective visual element 16. For example, where a visual element 16 within the scene 12 involves a foreground computational process, such as an active, computationally intensive process that relates to a proximity version of the visual presentation 74 (such as the rendering of a presentation version of a visual presentation 74 of a video), the foreground computational process may be executed when the zoom level 14 is in the proximity of the visual element 16, and may not be executed (e.g., by pausing the rendering of the video) when the zoom level 14 is not within a view proximity zoom level 14 of the visual element 16, even if the distant version of the visual presentation 74 of the visual element 16 is presented within the scene 12. This configuration may allow many visual elements 16 featuring intensive foreground computational processes to be located within the scene 12, and to allocate the computational resource of the rendering device based on an expressed interest of the user 76 in a particular visual element 16. Alternatively or additionally, one or more visual elements 16 within the scene 12 may involve a background computational process (such as a low-level process that performs a small amount of computation in order to maintain the freshness of the visual presentation 74 of the visual element 16), and an embodiment may be configured to execute the background computational process when the zoom level 14 is not within a view proximity zoom level 14 of the visual element 16.

Figure 8:
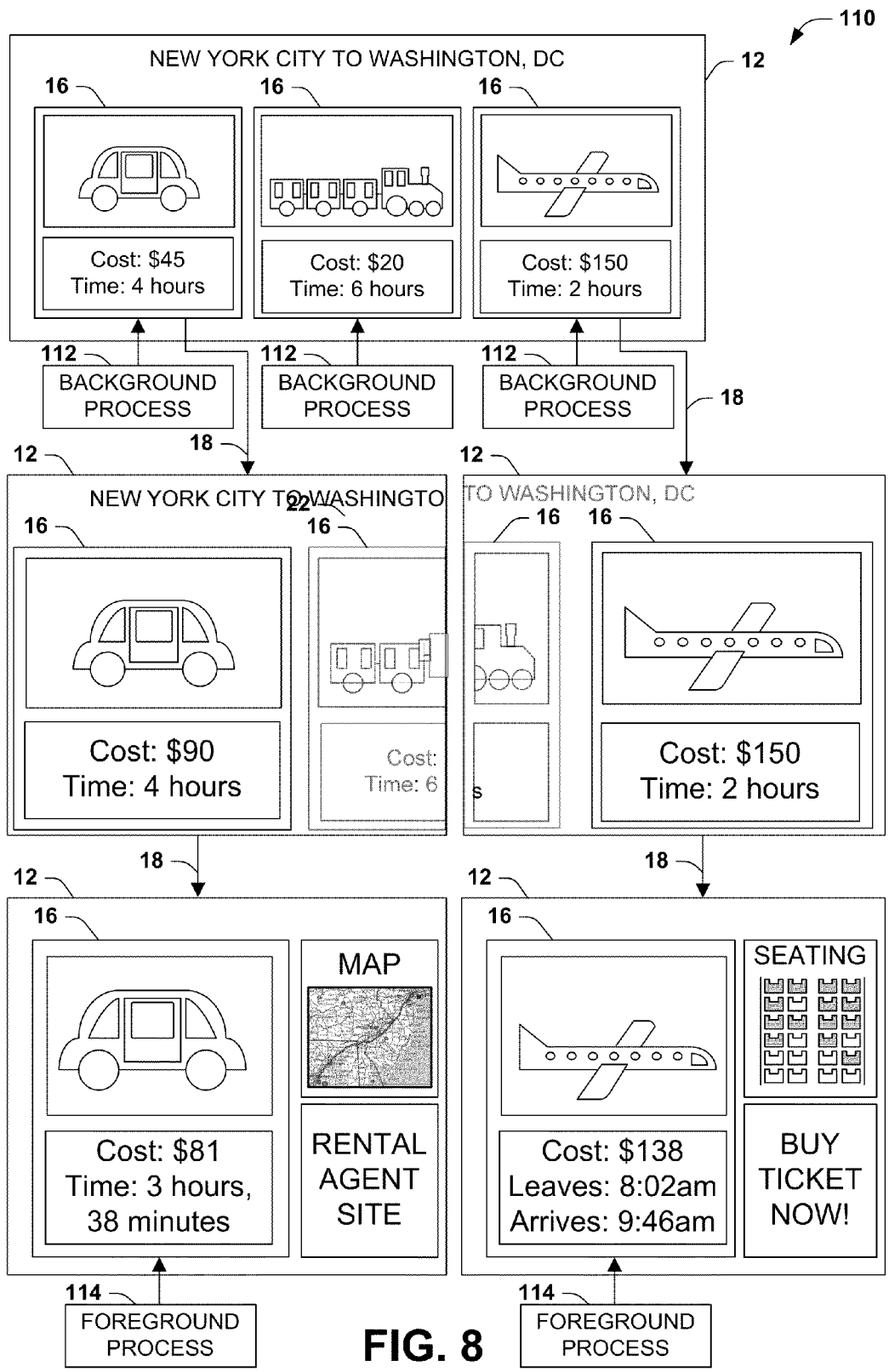
FIG. 8 is an illustration of an exemplary scenario featuring an allocation of processing of visual elements in relation to the zoom level of the zoomable scene.

FIG. 8 presents an illustration of an exemplary scenario 110 featuring several of these techniques, comprising an embodiment of a travel service that endeavors to suggest various options for traveling from New York City to Washington, D.C. This travel service may suggest three options—a rental car, a train, and an airplane—and may present these options to the user 76 as visual elements 16 within a scene 12. In accordance with some variations of this third aspect, respective visual elements 16 may include a background computational process 112 that endeavors to identify, retrieve, and present to the user 76 some basic information about each option. The background computational processes 112 may involve a small or modest amount of computing resources, such as a retrieval of a typical or average expense for each travel option and a typical travel time, which may be stored in a local database and easily retrieved for inclusion in the distant versions of the visual presentations 74 of the visual elements 16 within the scene 12. Accordingly, an embodiment of these techniques may concurrently execute the background computational processes 112 of some or all of the visual elements 16 (e.g., all of the visual elements 16 included in the scene 12, or only the visual elements 16 that are visible at the current zoom level 14 of the scene 12). However, a zoom operation 18 may be received to zoom in on of these visual elements 16 as an indication of a selection thereof and/or an expression of user interest therein. The zoom operation 18 may be applied, e.g., by rendering a visual zoom transition 22, and may eventually arrive at a view proximity zoom level with respect to a particular visual element 16. Moreover, the visual element 16 may be associated with a foreground computational process 114 that, through a comparatively intensive computational process, generates more detailed, accurate, and/or current information about a travel option.

For example, in the exemplary scenario 110 illustrated in FIG. 8, a first visual element 16 representing the rental car travel option may involve a background computational process 112 that retrieves an estimated cost and duration of the trip, and a foreground computational process 114 that negotiates with local car rental agencies to retrieve a current low rental price; that generates a more accurate estimate of the travel duration in view of current road, traffic, and weather conditions; that presents a map and directions for the road trip; and that presents a portal to a car rental agent site (e.g., an advertisement, an offer for a discount on the rental, a transactional form to complete the car rental, or a communication session with an agent of the travel agency.) Accordingly, an embodiment of these techniques may, at a first zoom level 14 that is not in the proximity of the first visual element 16, execute the background computational process 112 of the first visual element 16 and present a visual presentation 74 comprising a distant version of the first visual element 16 within the scene 12 featuring a summary of estimated costs and durations; and, upon receiving a zoom operation 18 that zooms into the proximity of the first visual element 16, may execute the foreground computational process 114 of the first visual element 16 and present a visual presentation 74 comprising a proximate version of the first visual element 16 within the scene 12 featuring the set of current and highly detailed information about the first travel option. Similarly, the exemplary scenario 110 also features a second visual element 16 representing the air travel option that involves a background computational process 112 that is configured to retrieve an estimated cost and duration of the air travel, and a foreground computational process 114 that negotiates with airlines to identify a suitable (e.g., timely and low-cost) scheduled flight; that presents the current costs, times, and seat availability on the flight; and that initiates a transaction to purchase a ticket on behalf of the user 76. An embodiment of these techniques may, at a first zoom level 14 that is not in the proximity of the second visual element 16, execute the background computational process 112 of the first visual element 16 and present a visual presentation 74 comprising a distant version of the second visual element 16 within the scene 12 featuring a summary of estimated costs and durations; and, upon receiving a zoom operation 18 that zooms into the proximity of the second visual element 16, may execute the foreground computational process 114 of the second visual element 16 and present a visual presentation 74 comprising a proximate version of the first visual element 16 within the scene 12 featuring the set of current and highly detailed information about the suitable flight. In this manner, the embodiment may execute the foreground computational processes 114 and the background computational processes 112 of the visual elements 16, while efficiently allocating the computing resources based on the zoom level 14 of the scene 12. Those of ordinary skill in the art may devise many ways of differently presenting a distant view and a proximate view of a visual element 16, in view of the current zoom level 14 of the scene 12 featuring the visual element 16, while implementing the techniques presented herein.

A fourth aspect that may vary among embodiments of these techniques relates to the visual presentations 72 that are selected for a visual element 16 when the zoom level 14 of the scene 12 is at a shallow zoom level or a deep zoom level regarding the visual element 16. For example, for a particular visual element 16, a range of proximity zoom levels may be available, such as increasingly high zoom levels 14 centered on different portions of the visual element 16. These different zoom levels 14 may be interpreted accordingly; e.g., a first zoom level 14 within the proximity of a visual element 16 may be interpreted as a shallow zoom level, while a second zoom level 14 within the proximity of a visual element 16 may be interpreted as a deep zoom level. Accordingly, different visual presentations 74 of the visual element 16 may be associated with the shallow zoom level and the deep zoom level regarding the visual element 16.

As a first example of this fourth aspect, a first visual presentation 74 of a visual element 16 may comprise a portal to the second visual presentation 74 of the visual element 16. For example, where the visual element 16 permits the user 76 to navigate to a particular target, such as a location (such as a website), data set, or media object, the second visual presentation 74 may comprise a presentation of the target, while the first visual presentation 74 may comprise a portal to the target. For example, in the exemplary scenario 110 of FIG. 8, the proximate view of the visual presentation 74 of the visual element 16 representing the first travel option includes (as a visual presentation 74 of the visual element 16 associated with a shallow zoom level) a portal to a rental agent site, such as the website of a rental agency that may facilitate the rental of a car to the user 76. This portal may be presented, e.g., as a simple indication of the target (e.g., "zoom in here to visit the website of the rental agency!"), or as a preview version of the target (e.g., a static screenshot of the front page of the website of the travel agency.) However, if the user 76 performs a zoom operation 18 resulting in a deep zoom of the visual element 16 on this portal, a different visual presentation 74 of the visual element 16 may be selected and presented that includes a fully operational version of the target, such as an embedded web browser that is navigated to the front page of the website. In this manner, the first visual presentation 74 of the visual element 16 associated with the shallow zoom level may semantically represent and visually indicate a portal to the target that is presented in the second visual presentation 74 of the visual element 16 associated with the deep zoom level. Moreover, a portal may also a series of targets associated with a set of zoom levels 14, and such targets may be arranged in multiple layers, such as zooming in through a first portal in a first data set to view a second data set, and zooming in through a second portal in the second data set to view a third data set.

As a second example of this fourth aspect, the first visual presentation 74 associated with a shallow zoom level 14 may comprise a first data set, and the second visual presentation 74 associated with a deep zoom level 14 may comprise the first data set supplemented with at least one supplemental data item. For example, in the exemplary scenario 20 of FIG. 2, a first zoom level 14 may present a distant view of a visual element 16 (such as an artwork), and a second zoom level 14 may present a proximity view of the visual element 16 at a shallow view level 14, e.g., a presentation of additional details about the artwork depicted in the zoomed-in visual element 16. However, although not shown in the exemplary scenario 20 of FIG. 2, it may be possible to designate a third zoom level 14 that represents a deep zoom level relating to the visual element 16, and that, instead of navigating to a different data set (such as the biography of the artist of the artwork depicted in the visual element 16), supplements the data set presented with the visual element 16 with at least one additional data item. For example, upon zooming more deeply into the second zoom level 14, additional information about the artwork might fade into view (possibly in a smaller font) between the already presented text, such as the type of canvas, the location where the artwork was created, and the names of artistic styles and techniques presented in the artwork. In this manner, the first visual presentation 74 of the visual element 16 associated with the shallow zoom level may be supplemented with additional data items by zooming into a deep zoom level regarding the visual element 16.

As a second example of this fourth aspect, the first visual presentation 74 associated with a shallow zoom level 14 may comprise a first data set, and the second visual presentation 74 associated with a deep zoom level 14 may comprise a presentation of a second data set that comprises an element within the first data set. For example, a visual element 16 within a presentation of a sports league may represent a particular sports team, and zooming into the proximity of the visual element 16 (at a shallow zoom level 14) may result in a visual presentation 74 providing information about the sports team, such as its history, its win/loss record, and a roster of players. However, zooming into the visual element 16 to a deep zoom level 14 on an entry in the roster of players may result in a visual presentation 74 that provides information about the player, such as his or her skills, earned awards, and scoring record in the current season. This example is also utilized in the exemplary scenario 100 of FIG. 7, wherein the first zoom level 14 is associated with a first visual presentation 74 comprising a distant view of a visual element 16 representing a building in a neighborhood; the second zoom level 14 is associated with a second visual presentation 74 comprising a proximity view of the visual element 16 representing a shallow zoom level of the building (as a first data set); and the third zoom level 14 is associated with a third visual presentation 74 representing a deep zoom level of the building, and also featuring a visual presentation 74 of a rental unit within the building (as a second data set). In this manner, the shallow and deep zoom levels 14 may permit the navigation of the zoom level 14 of the scene 12 among the constituent parts of a proximate visual element 16.

As a third example of this fourth aspect, the first visual presentation 74 associated with a shallow zoom level 14 may comprise a first data set, and the second visual presentation 74 associated with a deep zoom level 14 may comprise a presentation of a second data set that has no direct relationship with the first data set. This example is presented, e.g., in the exemplary scenario 20 of FIG. 2, wherein a first zoom level 14 of a scene 12 presents a visual representation 74 of a distant view of an artwork represented as a visual element 16, and a second zoom level 14 of the scene 12 presents a visual representation 74 of a proximate view of the artwork (at a shallow zoom level 14) that includes (as a first data set) additional information about the artwork. However, the third zoom level 14 presents a visual representation 74 of the visual element 16 at a deep zoom level 14. Moreover, because the zoom operation 18 is centered on the name of the artist who created the artwork depicted in the visual element 16, the deep zoom level 14 of the visual element 16 presents a second data set involving the biography of the artist. This second data set has little relationship with the first data set, involving the details of the creation of the artwork depicted in the visual element 16. Nevertheless, the visual element 16 may permit the user 76 to zoom in on the name of the artist as a navigation option to view the unrelated second data set associated with the name of the artist. In this manner, the shallow and deep zoom levels 14 may permit the navigation of the zoom level 14 of the scene 12 among even unrelated data sets. Those of ordinary skill in the art may devise many such visual differences between the visual presentations 74 associated with a shallow zoom level 14 and a deep zoom level 14 of a visual element 16 while implementing the techniques presented herein.

A fifth aspect that may vary among embodiments of these techniques relates to additional features that may be included in various implementations of such techniques. As a first example, a visual element 16 may have a particular state, such as a set of data associated with the visual element 16 that may be altered by an interaction with the user 74 and/or based on a background computational process 112 and/or foreground computational process 114. An embodiment of these techniques may permit at least one visual presentation 74 of the visual element 16 to be updated to reflect the state of the visual element 16. For example, a visual presentation 74 of one of the visual elements 16 in the exemplary scenario 110 of FIG. 8 may comprise a bitmap depicting the information included at the first zoom level 16, and the background process 112 of the visual element 16 may periodically retrieve this information, store it as part of the state of the visual element 16, and (if the information has changed since a retrieval during a previous period) update the bitmap to reflect the refreshed information.

As a second example of this fifth aspect, the retrieval of visual presentations 74 may be performed in many ways. Some scenarios may involve a scene 12 comprising a large number of visual elements 16, and/or a large number of visual presentations 74 of such visual elements 16, and/or a large amount of data involved in one or more visual presentations 84 of a visual element 16. Therefore, it may be difficult for an embodiment of these techniques to retain in memory all of the data comprising all of the visual presentations 74 for all of the visual elements 16 of the scene 12. Accordingly, the embodiment may be configured to manage the loading of visual presentations (e.g., from the visual presentation store 68) on an ad hoc basis. In a first such variation, the embodiment may be configured to load from the visual presentation store 68 a visual presentation 74 of a visual element 16 when the zoom level 14 of the scene 12 transitions to a zoom level 14 associated with the visual presentation 74 of a visual element 16 that is presented within the scene 12. For example, when a zoom operation 18 is received that results in the transition of the scene 12 to a new zoom level 14, the embodiment may identify the visual elements 16 that are visible within the scene 12 at the new zoom level 14, identify (for each visual element 16) a visual presentation 74 stored in the visual presentation store 68 that is associated with the new zoom level 14, and may retrieve these visual presentations 74 from the visual presentation store 68 (e.g., by loading these visual presentations 74 into system memory, or into a memory of a graphics processor.) Additionally, the embodiment may cache recently retrieved visual presentations 74, and may only retrieve visual presentations 74 from the visual presentation store 68 that are not currently stored in the cache. Moreover, these retrievals may be performed, e.g., during the rendering of the visual zoom transition 22 to the new zoom level 14. For example, in the exemplary scenario 20 of FIG. 2, upon receiving the first zoom operation 18 requesting a transition of the scene 12 to the second zoom level 14, an embodiment may request the second visual presentation 74 associated with the zoomed-in visual element 16 while concurrently rendering the visual zoom transition 22 (using the already available first visual presentation 74 of the visual element 16, e.g., by upscaling the low-resolution visual presentation 74 to simulate the depth-based visual zoom.) This technique may permit the ad hoc retrieval of the second visual presentation 74, while avoiding a performance delay (such as a momentary pause) during the retrieval of the second visual presentation 74 from the visual presentation store 68.

However, in some scenarios, an ad hoc retrieval may be inadequate, and may result in unacceptable performance or quality. As a first example, a transition to a new zoom level 14 may involve the loading of a potentially large number of visual presentations 74 (e.g., rapidly zooming out to show a large set of visual presentations 74 of a large set of images in a scene 12 representing an image set.) As a second example, one or more visual presentations 18 involve a significant amount of data, and/or the visual presentation store 68 may be accessible over a comparatively slow connection (such as the internet), and/or the duration of the visual zoom transition 22 may be brief; as a result, the visual presentations 74 may not be available promptly upon completion of the visual zoom transition 22, resulting in a momentary (or even protracted) application delay or loss of quality in the presentation. Accordingly, as an additional variation of this second example, an embodiment of these techniques may be configured to load visual presentations 74 on an ad hoc basis, but even before receiving a zoom operation 18, by predicting a transition to a new zoom level 14 that may imminently be requested by a user 76. If an embodiment of these techniques may predict imminent visual presentations 74 of visual elements 16 at an imminent zoom level 14 within the scene 12, then the embodiment, upon achieving such a prediction, load from the visual presentation store 68 a visual presentation 74 associated with the imminent zoom level 14 for the visual element 16 to be imminently presented. The embodiment may evaluate the current view of the scene 12 and the actions of the user 76 and other uses 76, and may therefore predict the next actions (including zoom operations 18) that are likely to be received from the user 76, and may therefore begin retrieving from the visual presentation store 68 any visual presentations 74 that may be involved in the presentation of the scene 12 at the new zoom level (and may not already have been retrieved, and that may not be available in a cache).

To these ends, an embodiment may predict the imminent zoom level 14 and/or the imminent visual presentations 74 of the scene 12 and/or visual elements 16 according to a set of visual presentation predictions, such as detecting a user action of the user 76 that suggests an imminent interaction of the user 76 with the visual element 74 at the imminent zoom level 14 (e.g., a visual element 16 that the user 76 is likely to select for zooming into proximity or into a deeper zoom level, based on the history of the user 76, the demographic information of the user 76, and any other information about the user 76 or the scene 12 that may be predictive of imminent actions of the user 76.) The embodiment might also identify, at a prior zoom level 14 of the scene 12 that is equivalent with the zoom level 14 of the scene 12, a prior interaction of the user 76 with the visual element 16 at the imminent zoom level 14 (e.g., a previous viewing of the scene 12 by the user 76 at an equivalent zoom level 14 that resulted in an interaction of the user 76 with a particular visual element 16, and that may be predictive of the user 76 to wish to interact with the same or an equivalent visual element 16) The embodiment might also identify, at the zoom level 14 of the scene 12, a frequent interaction of users 76 with the visual element 76 at the imminent zoom level 14 (e.g., an action that is often taken by other users 76 at the current zoom level 14 of the scene 12 that results in an interaction with a particular visual element 76, and that may be similarly taken by the current user 76.) Other predictive techniques might involve, e.g., the evaluation of demographic information of the user 76 to evaluate potential user interests in the visual elements 16; statistical analyses of the behavior of the user 76; and the use of learning techniques (such as neural networks and genetic algorithms) that may have been trained to predict user interactions 16 with visual elements 16 of the scene 12. By making such predictions, the embodiment may begin loading the visual presentations 74 of various visual elements 16 in the scene 12 significantly before the actual presentation of the visual presentations 74, thereby improving the performance of the embodiment.

Figure 9:
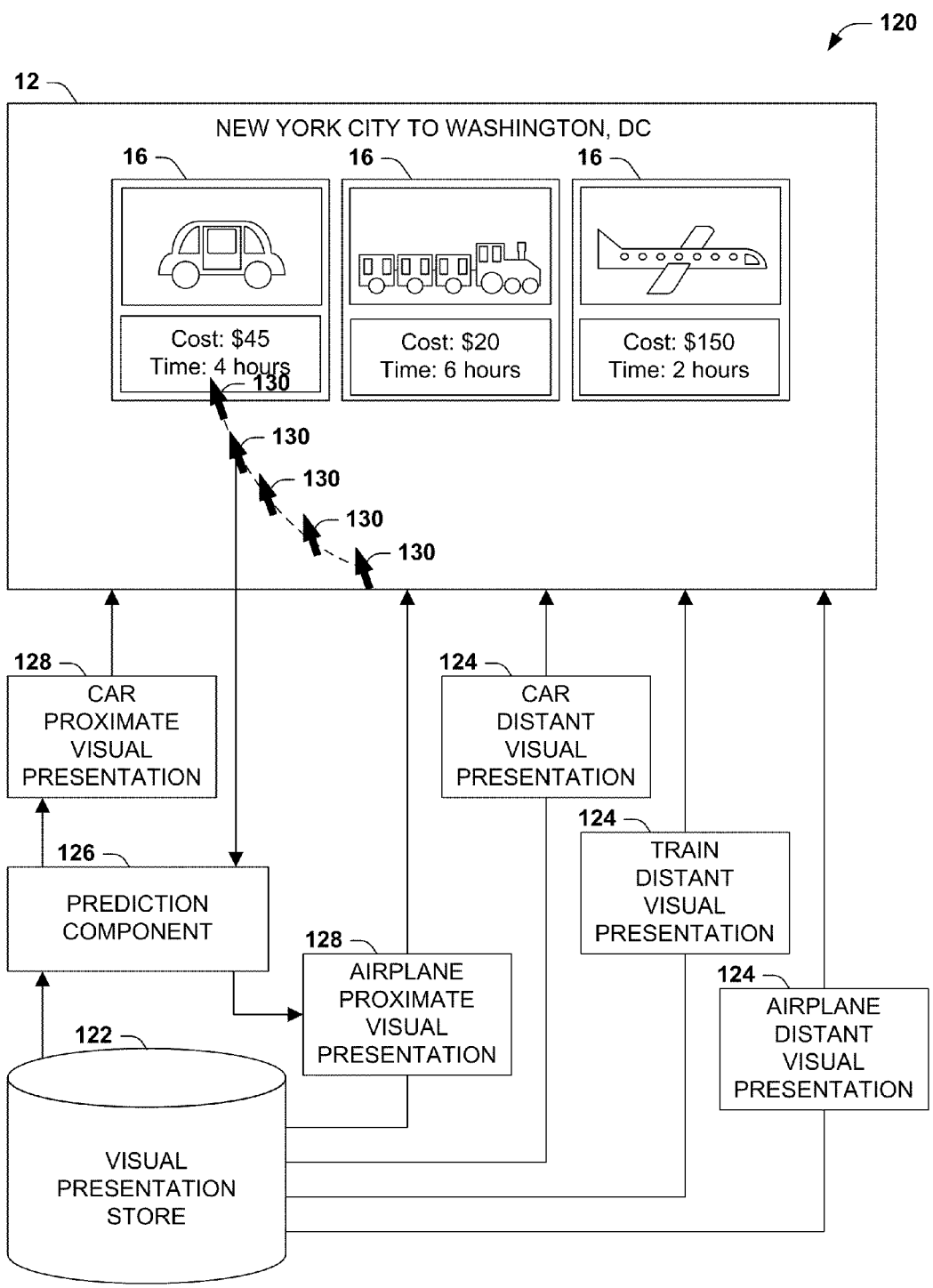
FIG. 9 is an illustration of an exemplary scenario featuring a prediction of an imminent visual presentation of a visual element at an imminent zoom level based on various predictive techniques.

FIG. 9 presents an exemplary scenario 120 featuring the use of various techniques for predicting a user interaction with a visual element 16 that may result in the imminent presentation of another visual presentation 74 at a new zoom level 14. In this exemplary scenario 120, three visual elements 16 are present that indicate various options for completing a trip. The scene 12 is instantiated at a low zoom level 14, and accordingly, the distant visual presentation 124 of each visual element 16 is retrieved from the visual presentation store 122. However, a prediction component 126 is also included that issues predictions about the imminent use of visual presentations 74 of various visual elements 16, and that prompts the loading of such visual presentations 74 from the visual presentation store 122. The predictive component 126 may comprise, e.g., a statistical evaluation technique, an expert system, or a learning component that has been trained to identify imminent actions of users 76 with the scene 12, such as an artificial neural network or a genetic algorithm. As a first example, among the options presented in the scene 12, the prediction component 126 may identify that users 76 often choose (or at least express an interest in) the airplane option. Accordingly, irrespective of the user input of the user 76 with the scene 12, and perhaps even as early as loading the scene 12, the prediction component 126 may prompt an embodiment of these techniques to retrieve from the visual presentation store 122 the proximate visual presentation 128 for the third visual elements 16 representing the airline option. As a second example, the prediction component may monitor the user actions 130 of the user 76, such as the trajectory of a pointing device. When the user actions 130 suggest a movement toward a particular visual element 16, such as the first visual element 16, the prediction component may predict that the user 76 is likely to zoom in on this visual element 16, and may prompt the embodiment of these techniques to load the proximate visual presentation 128 for this visual element 16 from the visual presentation store 122. In this manner, the prediction component may facilitate an early retrieval of such visual elements 16 from the visual presentation store 122, which may promote the availability of the visual presentations 16 upon transitioning to a new zoom level 14.

A particular technique for achieving the detection and prediction of imminent interactions of the user 76 with visual elements 16 within the scene 12 involves the use of a scene graph. Particularly within the field of three-dimensional graphics (which may be involved in rendering the zoomable scene 12 and visual elements 16), the data comprising the scene 12 is often stored in a scene graph data structure in order to promote the rapid identification of visual elements 16 that are visible within a particular view of the scene 12. While the data objects residing within the scene graph typically indicate various visual properties of the objects of the three-dimensional scene 12 (such as polygons and meshes), it may be possible to utilize the scene graph to facilitate the prediction of imminent user interactions with various visual elements 16 of the scene 12. In particular, it may be possible to generate within the scene graph a trigger, which may not represent a visible object, but which may indicate a proximity of the actions of the user 76 (such as a cursor of a pointing device) to a particular visual element 16 as a predictive indicator of an imminent interaction therewith. The prediction of the interaction may then be detected when a three-dimensional rendering technique that is configured to consume the scene graph to generate the three-dimensional rendering of the scene 12 detects a triggering of this trigger (such as a proximity of the view or the cursor to the trigger), which may prompt the embodiment to load a proximate visual presentation 128 of one or more visual elements 16 associated with the trigger. In this manner, the scene graph may be utilized to facilitate the prediction of imminent presentations of particular visual elements 16 of the scene 12 at particular imminent zoom levels. Those of ordinary skill in the art may devise many predictive techniques that may facilitate the performance of embodiments thereof.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 10:
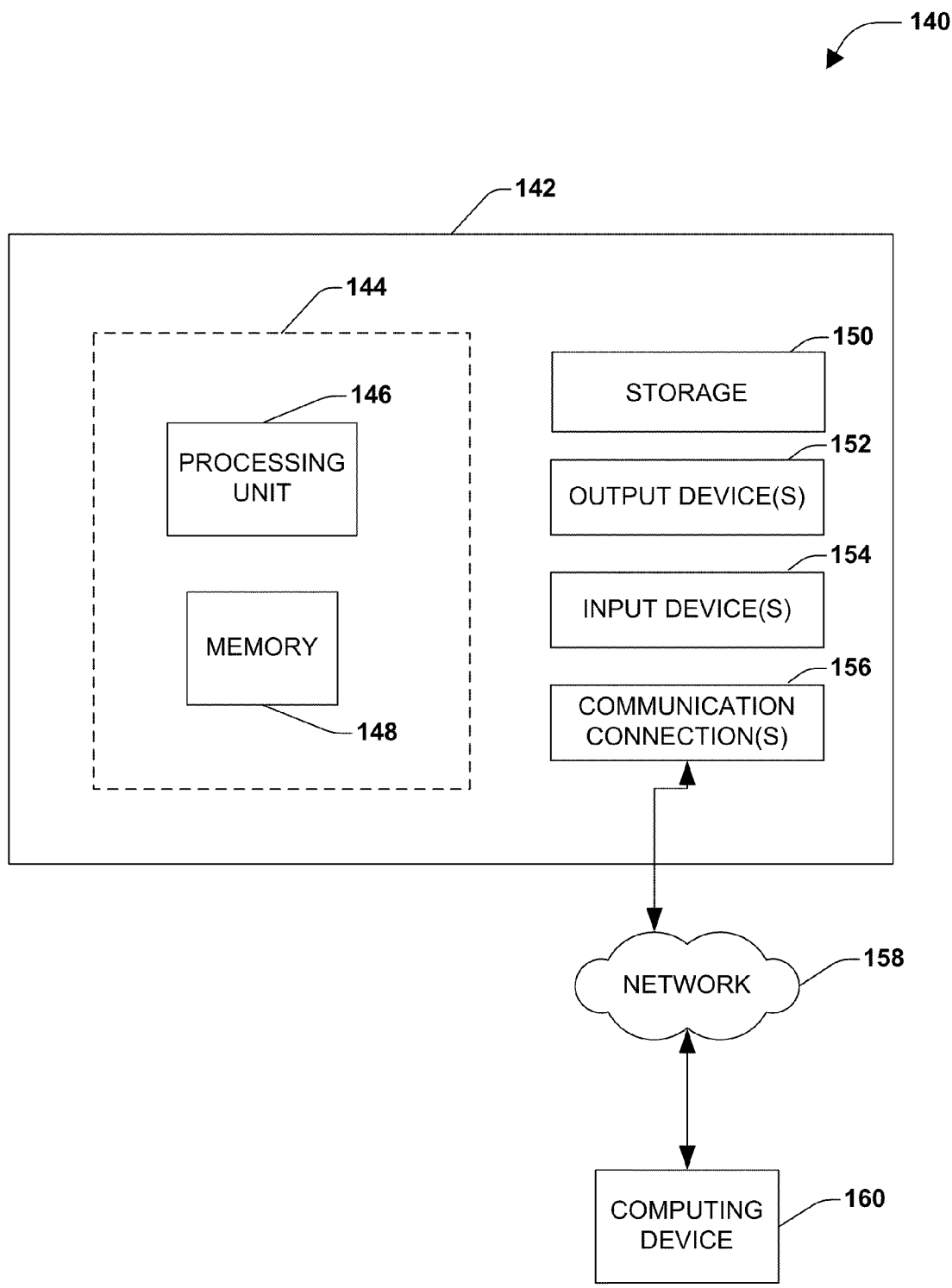
FIG. 10 illustrates an exemplary computing environment wherein one or more of the provisions set forth herein may be implemented.

FIG. 10 and the following discussion provide a brief, general description of a suitable computing environment to implement embodiments of one or more of the provisions set forth herein. The operating environment of FIG. 10 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 10 illustrates an example of a system 140 comprising a computing device 142 configured to implement one or more embodiments provided herein. In one configuration, computing device 142 includes at least one processing unit 146 and memory 148. Depending on the exact configuration and type of computing device, memory 148 may be volatile (such as RAM, for example), non-volatile (such as ROM, flash memory, etc., for example) or some combination of the two. This configuration is illustrated in FIG. 10 by dashed line 144.

In other embodiments, device 142 may include additional features and/or functionality. For example, device 142 may also include additional storage (e.g., removable and/or non-removable) including, but not limited to, magnetic storage, optical storage, and the like. Such additional storage is illustrated in FIG. 10 by storage 150. In one embodiment, computer readable instructions to implement one or more embodiments provided herein may be in storage 150. Storage 150 may also store other computer readable instructions to implement an operating system, an application program, and the like. Computer readable instructions may be loaded in memory 148 for execution by processing unit 146, for example.

The term "computer readable media" as used herein includes computer storage media. Computer storage media includes volatile and nonvolatile, removable and non-removable media implemented in any method or technology for storage of information such as computer readable instructions or other data. Memory 148 and storage 150 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 142. Any such computer storage media may be part of device 142.

Device 142 may also include communication connection(s) 156 that allows device 142 to communicate with other devices. Communication connection(s) 156 may include, but is not limited to, a modem, a Network Interface Card (NIC), an integrated network interface, a radio frequency transmitter/receiver, an infrared port, a USB connection, or other interfaces for connecting computing device 142 to other computing devices. Communication connection(s) 156 may include a wired connection or a wireless connection. Communication connection(s) 156 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 142 may include input device(s) 154 such as keyboard, mouse, pen, voice input device, touch input device, infrared cameras, video input devices, and/or any other input device. Output device(s) 152 such as one or more displays, speakers, printers, and/or any other output device may also be included in device 142. Input device(s) 154 and output device(s) 152 may be connected to device 142 via a wired connection, wireless connection, or any combination thereof. In one embodiment, an input device or an output device from another computing device may be used as input device(s) 154 or output device(s) 152 for computing device 142.

Components of computing device 142 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 142 may be interconnected by a network. For example, memory 148 may be comprised of multiple physical memory units located in different physical locations interconnected by a network.

Those skilled in the art will realize that storage devices utilized to store computer readable instructions may be distributed across a network. For example, a computing device 160 accessible via network 158 may store computer readable instructions to implement one or more embodiments provided herein. Computing device 142 may access computing device 160 and download a part or all of the computer readable instructions for execution. Alternatively, computing device 142 may download pieces of the computer readable instructions, or some instructions may be executed at computing device 142 and some at computing device 160.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method of presenting, within a scene having a zoom level, at least one visual element representing a first topic that is associated with an associated topic on a device having a processor, the method comprising:
   executing on the processor instructions configured to:
      upon receiving a zoom operation at a point within the scene, where the zoom operation transitions the scene to a new zoom level, transition the scene to the new zoom level; and
      present the scene by, for respective visual elements:
         at a first zoom level for the point within the scene, presenting the visual element at the first zoom level;
         at a second zoom level for the point within the scene that is higher than the first zoom level, presenting the visual element at the second zoom level and a second visual element indicating the associated topic; and
         at a third zoom level for the point within the scene that is higher than the second zoom level, presenting the second visual element indicating the associated topic and removing from the scene the visual element indicating the first topic.

2. The method of claim 1, the second zoom level presenting at least one visual difference of the first visual element as compared with the first zoom level, the visual difference selected from a visual differences set comprising:
   the first zoom level comprising a content set describing the first topic, and the second zoom level comprising a different content set describing the first topic;
   the first zoom level comprising a visual style, and the second zoom level comprising a different visual style;

the first zoom level comprising a data object of a data object type, and the second zoom level comprising a data object of a different data object type; and the first zoom level comprising a visual element functionality, and the second zoom level comprising a different visual element functionality.

3. The method of claim 1, at least one zoom level representing a scene context of the scene.

4. The method of claim 3, transitioning to the new zoom level comprising:
transitioning to the new zoom level if the new zoom level represents a scene context of the scene.

5. The method of claim 1:
the first zoom level not comprising a view proximity zoom level regarding the visual element and a distant version of the visual element;
the second zoom level comprising a view proximity zoom level regarding the visual element and a proximate version of the visual element.

6. The method of claim 5:
the first zoom level comprising a preview version of a media object; and
the second zoom level comprising a presentation version of the media object.

7. The method of claim 5:
at least one visual element within the scene involving a foreground computational process; and
the instructions configured to, for respective visual elements, execute the foreground computational process when the zoom level is within a view proximity zoom level of the visual element.

8. The method of claim 5:
at least one visual element within the scene involving a background computational process; and
the instructions configured to, for respective visual elements, execute the background computational process when the zoom level is not within a view proximity zoom level of the visual element.

9. The method of claim 1:
the first zoom level comprising a shallow zoom level regarding the visual element; and
the second zoom level comprising a deep zoom level regarding the visual element.

10. The method of claim 9, the first zoom level comprising a portal to the second zoom level.

11. The method of claim 9:
the first zoom level comprising a first data set associated with the first topic, and
the second zoom level comprising the first data set supplemented with at least one supplemental data item that is also associated with the first topic.

12. The method of claim 9:
the first zoom level comprising a first data set that is associated with the first topic, and
the second zoom level comprising a second data set that is an element within the first data set.

13. The method of claim 1, transitioning to the new zoom level comprising:
rendering a visual zoom within the scene from the zoom level to the new zoom level.

14. The method of claim 1, at least one visual presentation of the visual element reflecting a state of the visual element.

15. The method of claim 1:
respective visual elements comprising at least two visual presentations respectively presenting the visual element at different zoom levels, the visual presentations stored in a visual presentation store; and the instructions configured to load from the visual presentation store a visual presentation of a visual element when the zoom level of the scene transitions to a zoom level associated with the visual presentation of a visual element presented within the scene.

16. The method of claim 15, the instructions configured to:
predict imminent visual presentations of visual elements at an imminent zoom level within the scene; and
upon predicting an imminent visual presentation of a visual element at a zoom level within the scene, load from the visual presentation store a visual presentation associated with the imminent zoom level for the visual element.

17. The method of claim 16, predicting the imminent visual presentation selected from a set of visual presentation predictions comprising:
detecting a user action of a user that suggests an imminent interaction of the user with the visual element at the imminent zoom level;
identifying, at a prior zoom level of the scene that is equivalent with the zoom level of the scene, a prior interaction of the user with the visual element at the imminent zoom level; and
identifying, at the zoom level of the scene, a frequent interaction of users with the visual element at the imminent zoom level.

18. The method of claim 16:
the instructions configured to, within a scene graph representing the scene, generate a trigger associated with a visual element and indicating an imminent visual presentation of the visual element; and
predicting the imminent visual presentation comprising: detecting a triggering of the trigger within the scene.

19. A system for presenting at least one visual element representing a first topic that is associated with an associated topic within a scene having a zoom level, the system comprising:
a scene transitioning component configured to, upon receiving a zoom operation for a point within the scene, where the zoom operation transitions the scene to a new zoom level, transition the scene to the new zoom level; and
a scene presenting component configured to present the scene by, for respective visual elements:
a first zoom level for the point within the scene, presenting the visual element at the first zoom level;
at a second zoom level for the point within the scene that is higher than the first zoom level, presenting the visual element at the second zoom level and a second visual element indicating the associated topic; and
at a third zoom level for the point within the scene that is higher than the second zoom level, presenting the second visual element indicating the associated topic and removing from the scene the visual element indicating the first topic.

20. A computer-readable memory device storing instructions that, when executed on a processor of a device, cause the device to present, within a scene having a zoom level, at least one visual element representing a first topic that is associated with an associated topic, by:
upon receiving a zoom operation at a point within the scene, where the zoom operation transitions the scene to a new zoom level, transitioning the scene to the new zoom level; and
presenting the scene by, for respective visual elements:
at a first zoom level for the point within the scene, presenting the visual element at the first zoom level;

at a second zoom level for the point within the scene that is higher than the first zoom level, presenting the visual element at the second zoom level and a second visual element indicating the associated topic; and at a third zoom level for the point within the scene that is higher than the second zoom level, presenting the second visual element indicating the associated topic and removing from the scene the visual element indicating the first topic.

* * * * *